US010471559B2

(12) United States Patent
Dieter

(10) Patent No.: US 10,471,559 B2
(45) Date of Patent: Nov. 12, 2019

(54) INSERTABLE FASTENER INSTALLATION APPARATUS AND METHOD

(71) Applicant: STAFAST PRODUCTS, INC., Painesville, OH (US)

(72) Inventor: Jonathan Wayne Dieter, Painesville, OH (US)

(73) Assignee: STAFAST PRODUCTS, INC., Painesville, OH (US)

( * ) Notice: Subject to any disclaimer, the term of this patent is extended or adjusted under 35 U.S.C. 154(b) by 181 days.

(21) Appl. No.: 15/679,147

(22) Filed: Aug. 16, 2017

(65) Prior Publication Data

US 2018/0311775 A1 Nov. 1, 2018

Related U.S. Application Data

(60) Provisional application No. 62/492,768, filed on May 1, 2017.

(51) Int. Cl.
*B23P 19/10* (2006.01)
*B23P 19/00* (2006.01)
(Continued)

(52) U.S. Cl.
CPC ............ *B23P 19/105* (2013.01); *B21B 29/00* (2013.01); *B23P 19/004* (2013.01); *B23P 19/006* (2013.01); *B23P 19/06* (2013.01); *B23P 19/062* (2013.01); *B23P 19/064* (2013.01); *B23P 19/12* (2013.01); *B25J 9/0093* (2013.01); *B25J 9/0096* (2013.01);
(Continued)

(58) Field of Classification Search
CPC ..... B23P 19/105; B23P 19/004; B23P 19/006; B23P 19/06; B23P 19/062; B23P 19/064; B23P 19/12; Y10T 29/49833; Y10T 29/53039; Y10T 29/53052; Y10T 29/5343; B25J 9/0093; B25J 9/0096; B25J 9/1687; B25J 9/1697; B21B 29/00
See application file for complete search history.

(56) References Cited

U.S. PATENT DOCUMENTS 2,263,858 A * 11/1941 Borge .................. B23P 19/004
221/167
3,855,917 A * 12/1974 Farrell .................... B27F 7/155
100/100
(Continued)

FOREIGN PATENT DOCUMENTS

EP 0537926 A1 * 4/1993 ............. B21J 15/32
WO WO-2010043362 A2 * 4/2010 ............. B21J 15/32

*Primary Examiner* — Jermie E Cozart
(74) *Attorney, Agent, or Firm* — Woodling, Krost and Rust

(57) ABSTRACT

An insertable fastener installation apparatus for a flat substrate has a thickness, T. A roller press station is used to press T-nuts into holes in the substrate. An optical vision system detects the location of the holes in the moving substrate and aligns the t-nuts with the holes. A computer controlled pick and place robot takes T-nuts from an escapement of a hopper feed system and aligns, but does not fully insert, the t-nuts in the substrate. A conveyor system feeds the substrates through the optical vision system, the pick and place robot station and the roller press station. A first roller is spaced apart from a second roller by a gap in the roller press station and the gap is less than the thickness of the substrate. The hopper feed system includes a bulk hopper, a bowl, a track and an escapement.

18 Claims, 29 Drawing Sheets

(51) Int. Cl.
  *B23P 19/06* (2006.01)
  *B23P 19/12* (2006.01)
  *B21B 29/00* (2006.01)
  *B25J 9/00* (2006.01)
  *B25J 9/16* (2006.01)

(52) U.S. Cl.
  CPC ........... *B25J 9/1687* (2013.01); *B25J 9/1697* (2013.01); *Y10T 29/49833* (2015.01); *Y10T 29/53039* (2015.01); *Y10T 29/5343* (2015.01); *Y10T 29/53052* (2015.01)

(56) References Cited

U.S. PATENT DOCUMENTS

| | | | | |
|---|---|---|---|---|
| 4,437,234 | A * | 3/1984 | Thornton | B27F 7/155 100/913 |
| 5,560,099 | A * | 10/1996 | Leistner | B23P 19/062 29/432.2 |
| 5,606,794 | A * | 3/1997 | Leistner | B23P 19/062 227/130 |
| 2005/0071995 | A1* | 4/2005 | McNeelege | B27F 7/155 29/798 |
| 2008/0267737 | A1* | 10/2008 | Hatanaka | B25J 9/1687 414/1 |
| 2010/0057256 | A1* | 3/2010 | Sato | B23P 19/12 700/258 |
| 2012/0059517 | A1* | 3/2012 | Nomura | B25J 9/1612 700/259 |

\* cited by examiner

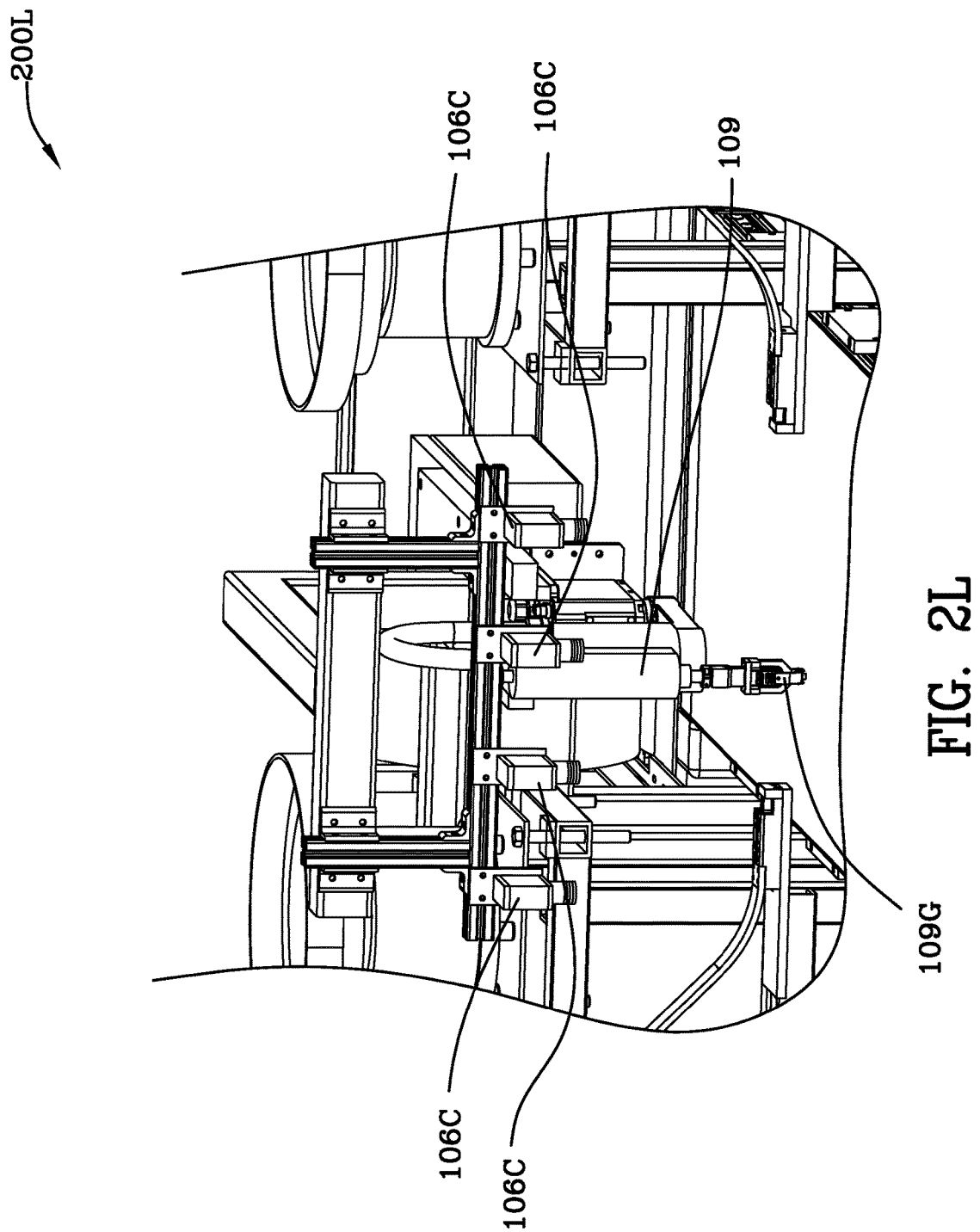

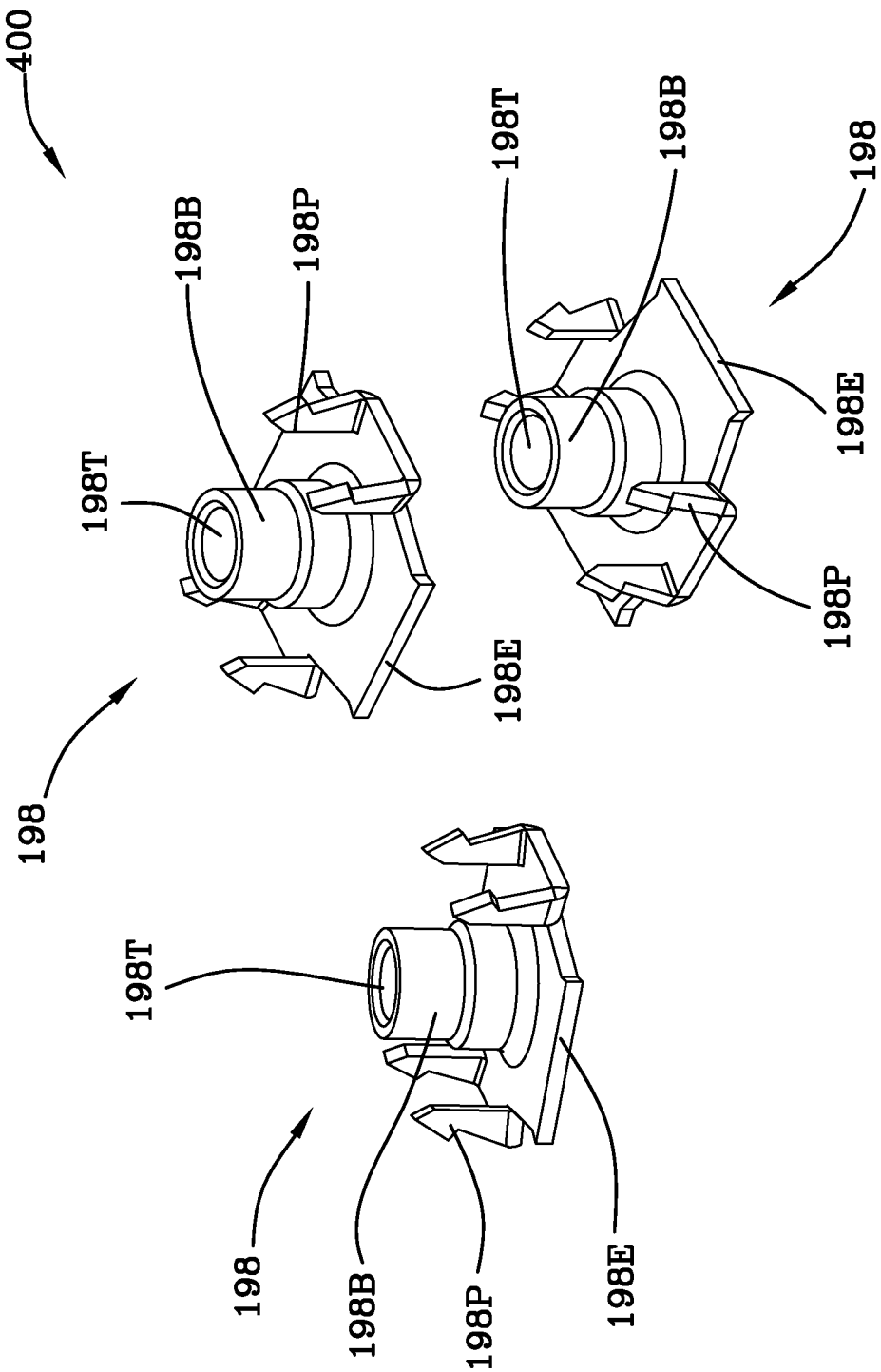

INSERTABLE FASTENER INSTALLATION APPARATUS AND METHOD

This patent application claims the benefit of and the priority to U.S. provisional patent application Ser. No. 62/492,768 filed May 1, 2017. This patent application incorporates U.S. provisional patent application Ser. No. 62/492,768 filed May 1, 2017 herein in its entirety by reference hereto.

FIELD OF THE INVENTION

The invention is in the field of installing insertable fasteners in substrates wherein the substrates are selected from the group consisting of wood, plywood, chipboard, oriented strand board, frame grade plywood, and plastic and the insertable fastener does not require deformation or rotation.

BACKGROUND OF THE INVENTION

Existing T-nut insertion machines use a human operator that places a component into the machine, locates the pre-drilled pilot hole, pushes down to depress a safety switch, and steps on a foot pedal. Once this is done, a pneumatic cylinder drives a T-nut downward at high velocity and pressure, installing it into the component. These machines, when used and maintained properly are safe and reliable. However, when these machines are misused injuries can occur. Many users bypass the safety switches or remove the safety shields from the machine. Doing so removes the machine operator's protection and there have been instances where the machine operator gets hurt. These injuries are expensive because of increased workers' compensation insurance, settlements, OSHA fines, downtime, lost production, etc. Along with financial loses, the machine operator can experience severe pain, broken bones, lacerations, reduction in dexterity, amputation, etc.

Another issue is high employee turnover rates. Employee turnover rates can be as high as 80%. This makes it difficult for them to keep employees who are properly trained. Also, production rates fluctuate greatly because of inconsistent employee turnout. The uncertainty of having employees show up to work is frustrating and can create financial losses.

SUMMARY OF THE INVENTION

To resolve the issues of operator safety and production reliability, an automated work insertable fastener installation apparatus has been developed. The insertable fastener installation apparatus will remove the need for an operator to physically place a component into a T-nut machine and manipulate its position to install T-nuts. Preferably, the insertable fastener is made of metal. Other materials may be used for the fastener. Keeping the operator out of harm's way mitigates the risk of injury to the operator. Production rates will be much more consistent and reliable. The insertable fastener installation apparatus only requires 1-2 operators to load and unload components. Therefore, the production that would typically be conducted on several T-nut machines by several employees is drastically reduced. As well as increasing safety and reliability, the insertable fastener installation apparatus offers the opportunity to reduce labor.

An insertable fastener installation apparatus for a substrate includes, necessarily, a flat substrate which has a thickness T. The substrates are selected from the group consisting of wood, plywood, chipboard, oriented strand board, frame grade plywood, and plastic. The insertable fastener F does not require deformation or rotation for successful installation. The insertable fastener may slightly rotate due to the outer shape of the barrel of the particular type of fastener being inserted. For example, a propel fastener made by the assignee of this invention, Stafast Products, Inc. of Painesville, Ohio may be inserted into the substrate. The substrate includes at least one hole therein, and usually the substrate includes multiple holes therein. The holes are prefabricated or pre drilled. A roller press station includes a first, lower, roller and a second, upper, roller. The first and second rollers include a drive system. The first and second rollers rotate in opposite directions when viewed along the axes of the rollers. The first roller, viewed from the left side of the apparatus, rotates in a counterclockwise direction. The second roller, viewed from the left side of the apparatus, rotates in a clockwise direction.

The first roller includes a first axis and the second roller includes a second axis, and, the first and second axes are parallel. The first roller is cylindrically shaped and includes a metal surface and the second roller is cylindrically shaped and also includes a metal surface. The cylindrically shaped rollers are sufficiently rigid meaning that they will not be deformed when the substrates are passed therethrough.

The metal surface of the first roller is spaced apart from the metal surface of the second roller by a gap therebetween. The size of the gap G is less than the thickness of the substrate thus compressing the substrate as it is fed into and through the roller station. As the substrate is fed through the roller station, the substrate is compressed and the insertable fasteners are driven into the substrate.

The apparatus includes a conveyor system having a first portion and a second portion. An optical vision system is used which includes at least one camera. A computer system controls the apparatus. A robot system is used to pick and place the insertable fasteners in position with respect to the holes in the substrate. The insertable fasteners are positioned such that the barrel of each of the fasteners partially resides within a respective one of the holes in substrate.

A hopper feed system includes a bulk hopper, a bowl, a track and an escapement. The bulk hopper includes a plurality of insertable fasteners therein. The bulk hopper feeds the insertable fasteners into a bowl. The bowl is rotatable and orients the insertable fasteners therein into alignment with the track. Once in the track, the insertable fasteners slide down the track into an escapement. The robot system includes a gripper which engages the flange of the insertable fasteners in the escapement and removes the insertable fastener therefrom for placement with respect to the holes in the substrate. The substrate resides on the first portion of the conveyor system where the substrate moves relative to the hopper feed system and the vision system. The gripper of the robot system transports the insertable fastener according to a command of the computer system. The computer system receives an image from the optical system and generates a movement command. The gripper of the robot system transports the insertable fastener according to the movement command of the computer system. The gripper of the robot system partially inserts the insertable fastener in the hole of the substrate.

The first portion of the conveyor drives the substrate toward and into the roller press. The first roller and the second roller rotate in opposite directions engaging the substrate and slightly compressing the substrate as it is driven through the roller press. As the substrate exits the first and the second rollers, the substrate is propelled onto the second portion of the conveyor system for transport away from the roller press station.

The substrates then pass through a roller press. The roller press station includes a first roller and a second roller. The rollers are large cylinders that drive the substrate forward through the roller press station, while applying a radial force to press the prongs of the T-nuts and the flange of the T-nuts into the substrate/board. This process could also be completed using a large vertical hydraulic press (not shown).

The instant invention provides ergonomic advantages as it reduces the labor and the movements of the operators in regard to the manipulation of the substrate.

BRIEF DESCRIPTION OF THE DRAWINGS

FIG. 2L is an enlarged perspective view of a portion of the insertable fastener installation apparatus Illustrating the camera system and the pick and place robotic system illustrated in FIG. 1.

FIG. 4 is a view of one type of insertable fastener.

DESCRIPTION OF THE INVENTION

Figure 1:
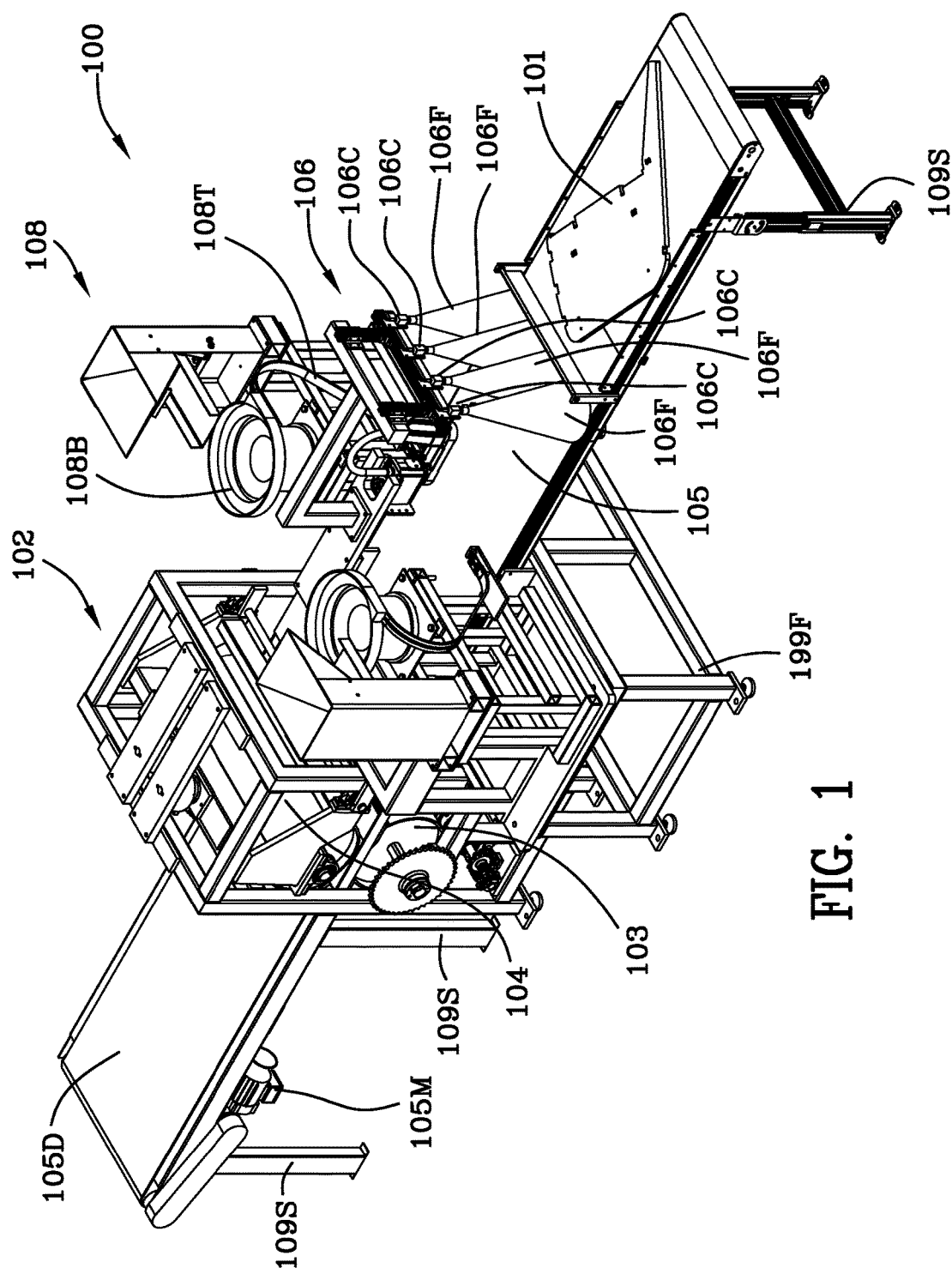
FIG. 1 is a top perspective view of the insertable fastener installation apparatus.

The insertable fastener installation apparatus utilizes the following components: conveyors, a vision system comprising an optical camera, a 4 Axis SCARA robot, one or more T-nut feed stations, a roller press station (or hydraulic press station (not shown)), and an electronically monitored safety enclosure.

A long conveyor belt (roughly 19' in length) feeds through the insertable fastener installation apparatus. There is a safety enclosure through which a first portion of the conveyor passes and through which a second portion of the conveyor passes. An entrance passageway and an exit passageway in the safety enclosure passageway allow the components on the conveyor belt to freely enter and exit the safety enclosure of the insertable fastener installation apparatus freely. There are no other continuously accessible openings in the insertable fastener installation apparatus. There are electronically monitored access doors that terminate the operation of the insertable fastener installation apparatus when opened. All moving parts of the apparatus stop when a door of the enclosure is opened.

Once inside the safety enclosure, the conveyor passes the component, usually a substrate with through holes pre-drilled therein, underneath a vision system, and then underneath a 4 Axis robot(s), and then into a roller press station or hydraulic press station. The robot(s) has/have two T-nut feed stations on either side thereof to supply a continuous supply of T-nuts. The robot is a 4 Axis robot but could be any robot with a sufficient number of axes.

The T-nuts are loaded into a bulk hopper which feeds them into the bowl as needed. The bulk hopper is controlled by a paddle switch. When the T-nut level in the bowl is low the paddle height lowers and turns the bulk hopper on. The bowl rotates in either a clockwise or counter-clockwise orientation. As the T-nuts revolve around the bowl they pass over various tools to orient their position. They exit the bowl in an orientation such that they line up with the track. As they exit, they slide down the track into the escapement. The track length is long for two reasons. One is to store an adequate supply of readily available T-nuts in the track. The second reason is that the T-nuts in the track are gravity fed. The more T-nuts in the track, the more weight, and in turn more back pressure to advance the T-nuts.

The operation of the work cell is as follows:

1) The insertable fastener installation apparatus operator places pre-drilled components onto the infeed side of the continuously moving conveyor belt. The components must not be overlapping and must be in a single layer.

2) The components advance through the entrance passageway of the safety enclosure and pass under a vision system. The cameras of this vision system recognize and record the presence of the pre-drilled holes. The vision system is integrated with the 4 Axis SCARA robot to process this information. The SCARA acronym stands for Selective Compliance Assembly Robot Arm or Selective Compliance Articulated Robot Arm.

3) The robot(s) picks up a T-nut from the escapement of the closest T-nut feed station using a pneumatic gripper. The robot(s) then place the barrel of a T-nut into the pre-drilled holes. This approximately centers the T-nut into the pre-drilled hole, but does not seat the T-nut prongs into the board. The robot cannot provide the force needed to do so and the prongs of the T-nut rest on the surface of the board. This process is repeated for holes of all incoming boards, that is, T-nuts are inserted therein.

4) The boards/substrates then pass through a roller press. The roller press station includes a first roller and a second roller. The rollers are large cylinders that drive the board forward through the roller press station, while applying a radial force to press the prongs of the T-nuts into the board/substrate. This process could also be completed using a large vertical hydraulic press (not shown). If a large vertical press is used, then the operation of the conveyor must provide for indexing of the boards/substrates as they are momentarily placed under the press without motion of the boards/substrates. Alternatively, the boards/substrates may continue moving but the press has to also move in synchronism with the boards/substrates as it is moving vertically upward and downward.

5) At this point the board is processed and it exits the safety enclosure on the out feed side of the conveyor. At this point the processed boards can be unloaded by an operator or fed into a collection bin.

The insertable fastener installation apparatus for a substrate 101 disclosed herein uses a substrate 101 which is flat and has a thickness T. Substrate thicknesses of 13-18 mm are typical. Other thicknesses may be used. See FIGS. 1 and 4C. The substrate can be of any shape and the holes 101H can be located anywhere therein. There can be just one hole in the substrate or there can be a plurality of holes and they can be spaced anywhere in the substrate. The holes can be randomly pre-drilled in the substrate.

The insertable fastener installation apparatus includes an optical vision system 106 for detecting the pre-drilled holes 101E in the substrate, a hopper feed system 108 for storing and delivering insertable fasteners 198 to an escapement 108E, a robotic system 109 for picking the insertable fasteners 198 out of the escapement 108E and placing them into the pre-drilled holes 101H in the substrate 101, and a roller press station 102 which engages and compresses the substrate 101 and presses the insertable fasteners 198 into the substrate. See FIGS. 1, 1A, 2, 2A, and 2B. FIGS. 2C-H are views of the escapement 108E. In particular, see FIG. 4C illustrating substrate 101 being compressed by lower roller 103 and upper roller 104. Gap G between the roller surfaces is adjustable and is smaller in magnitude than the thickness of the substrate. Substrates having different thicknesses may be used. Holes 101H in the substrate may be randomly arranged according to the needs of the end user. Typically, the holes in the substrate have a diameter to fit the end portion of the barrel which illustrates the barrel portion 198B of the T-Nut 198. Also see FIG. 4B which illustrates the barrel 198B of the T-Nut in the hole 101H of the substrate. Arrows R1, R2 illustrating the rotational directions of rollers 103, 104 respectively which drives the substrate 101 in the direction of arrow D as illustrated in FIG. 4B. Typically, the holes 101H are 8 mm or 9 mm in diameter. Holes are made in the diameter required for a particular insertable fastener, whether it is a T-Nut or some other type of fastener.

Figure 2:
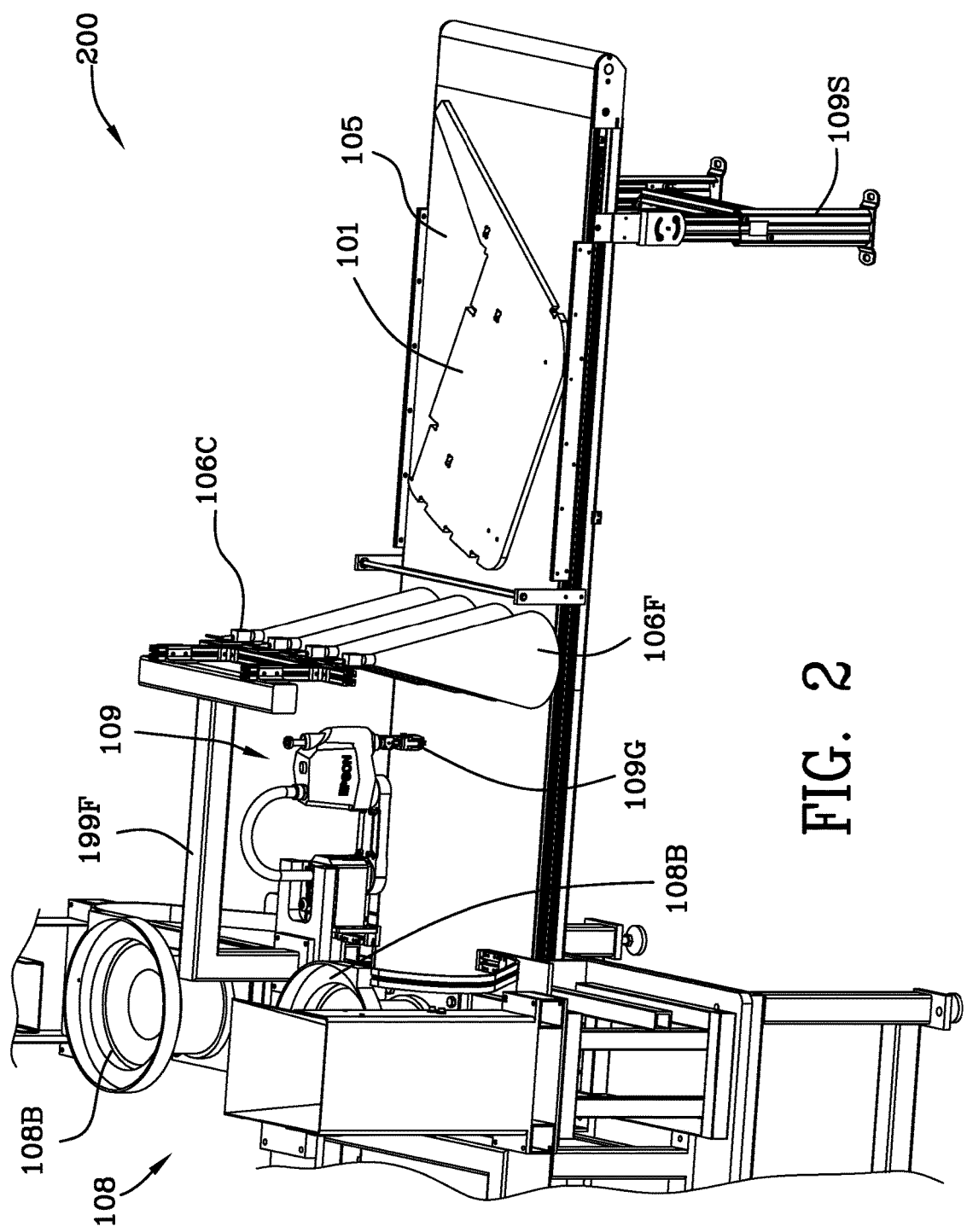
FIG. 2 is a top perspective view of a portion of the insertable fastener installation apparatus illustrating the cameras, the robot pick and place system, the tracks and their respective escapements.
Figure 2A:
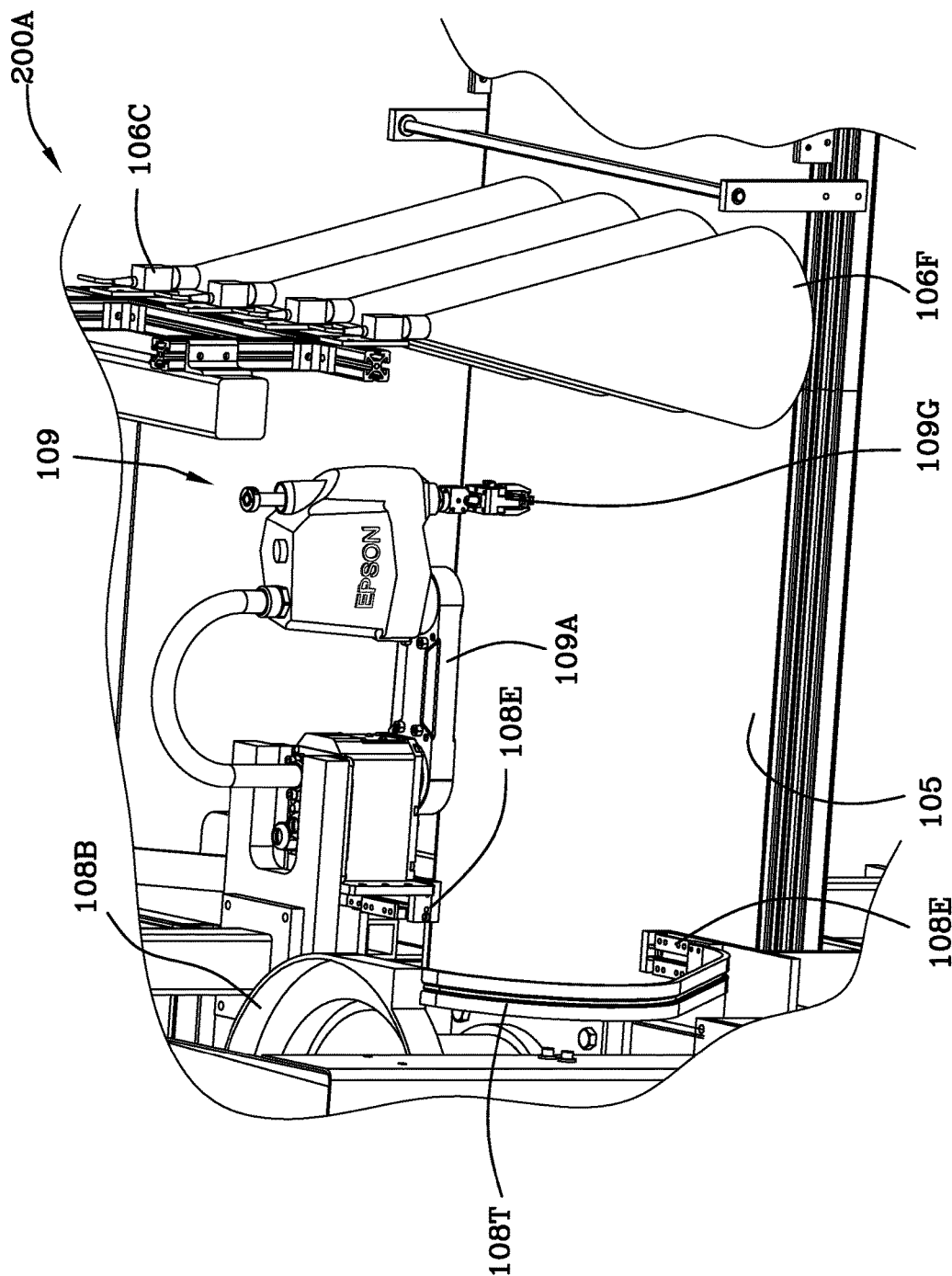
FIG. 2A is an enlargement of a portion of FIG. 2 illustrating the cameras, the robot pick and place system, the tracks and their respective escapements.
Figure 2B:
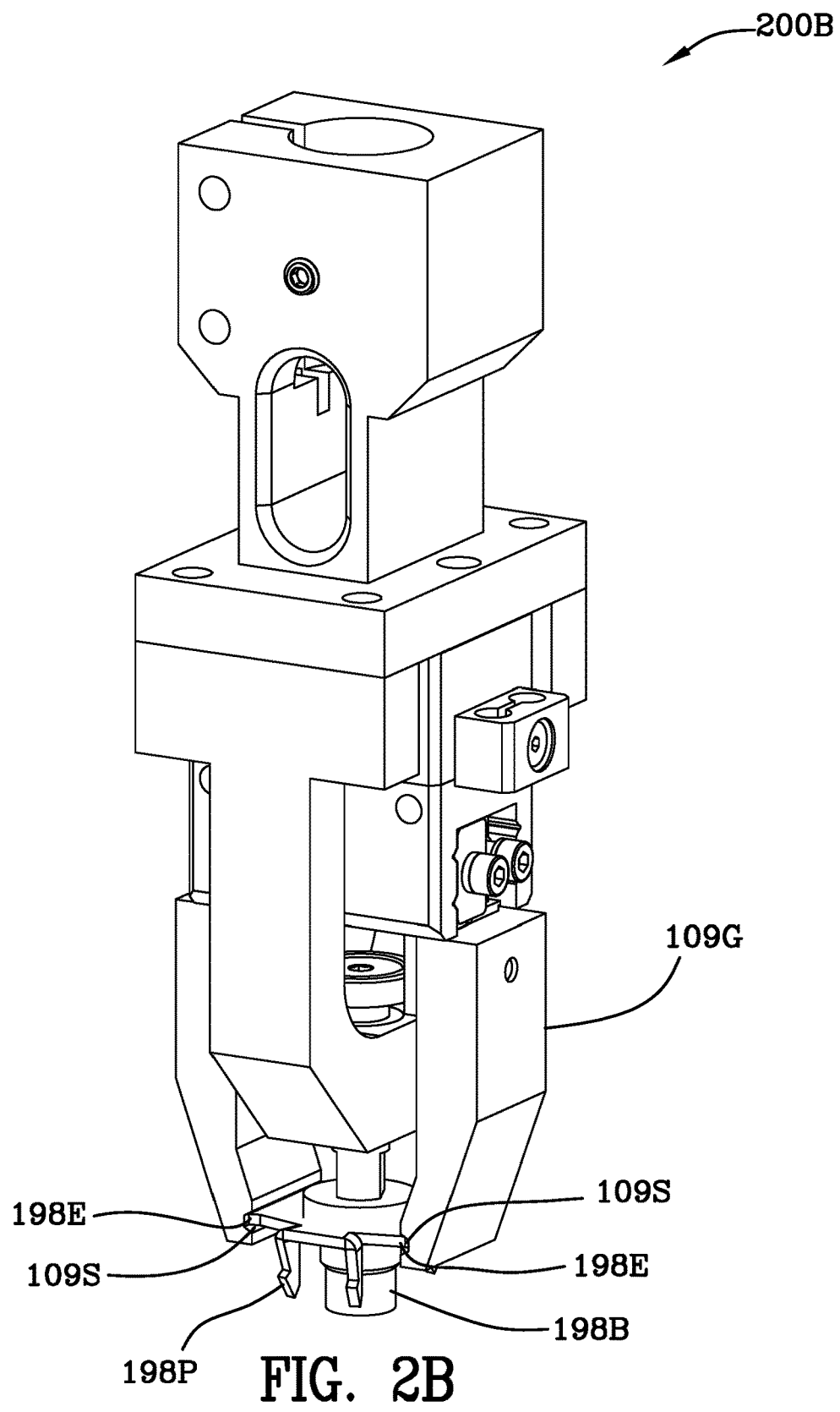
FIG. 2B is a perspective view of the robotically operated gripper.
Figure 2C:
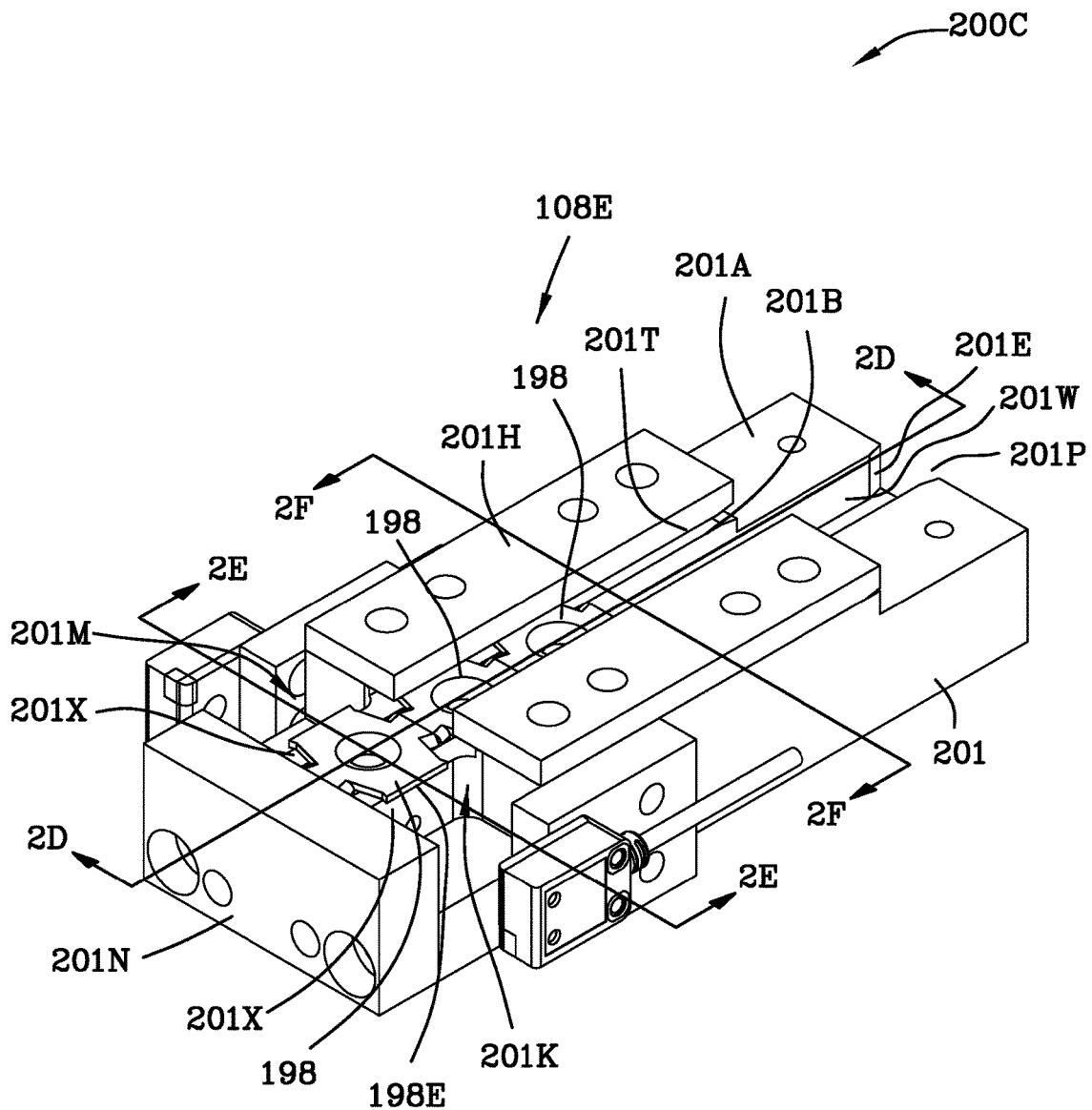
FIG. 2C is a perspective view of the escapements with some T-Nut insertable fasteners therein.
Figure 2D:
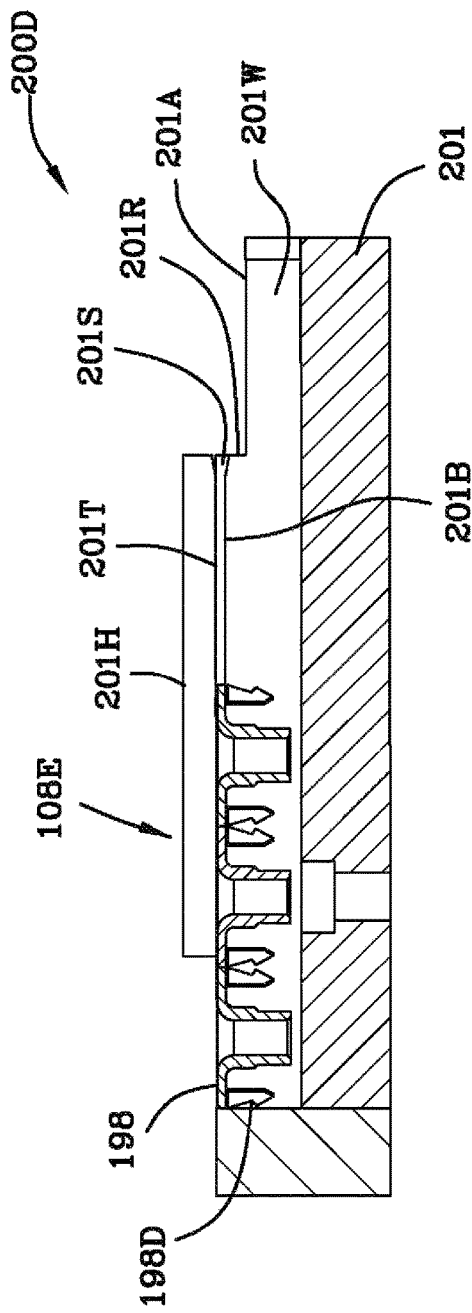
FIG. 2D is a cross-sectional view of the escapement illustrated in FIG. 2C taken along the lines 2D-2D of FIG. 2C.
Figure 2E:
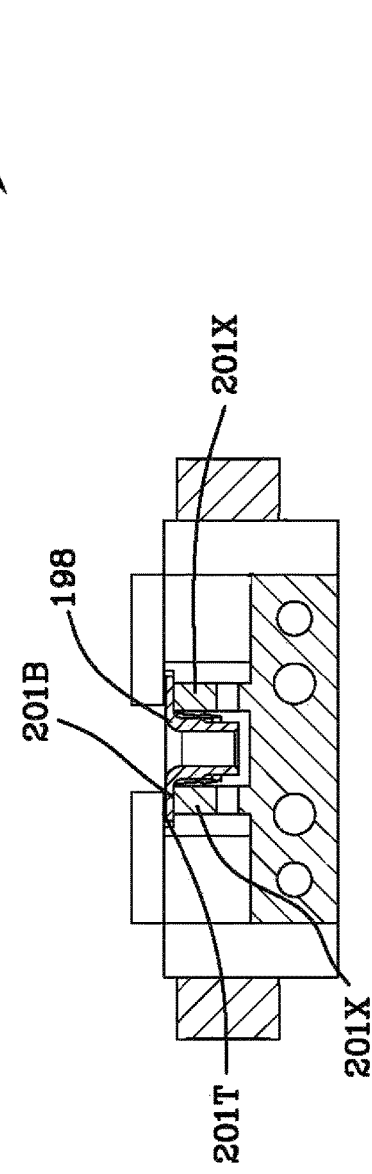
FIG. 2E is a cross-sectional view of the escapement illustrated in FIG. 2C taken along the lines 2E-2E of FIG. 2C.
Figure 2F:
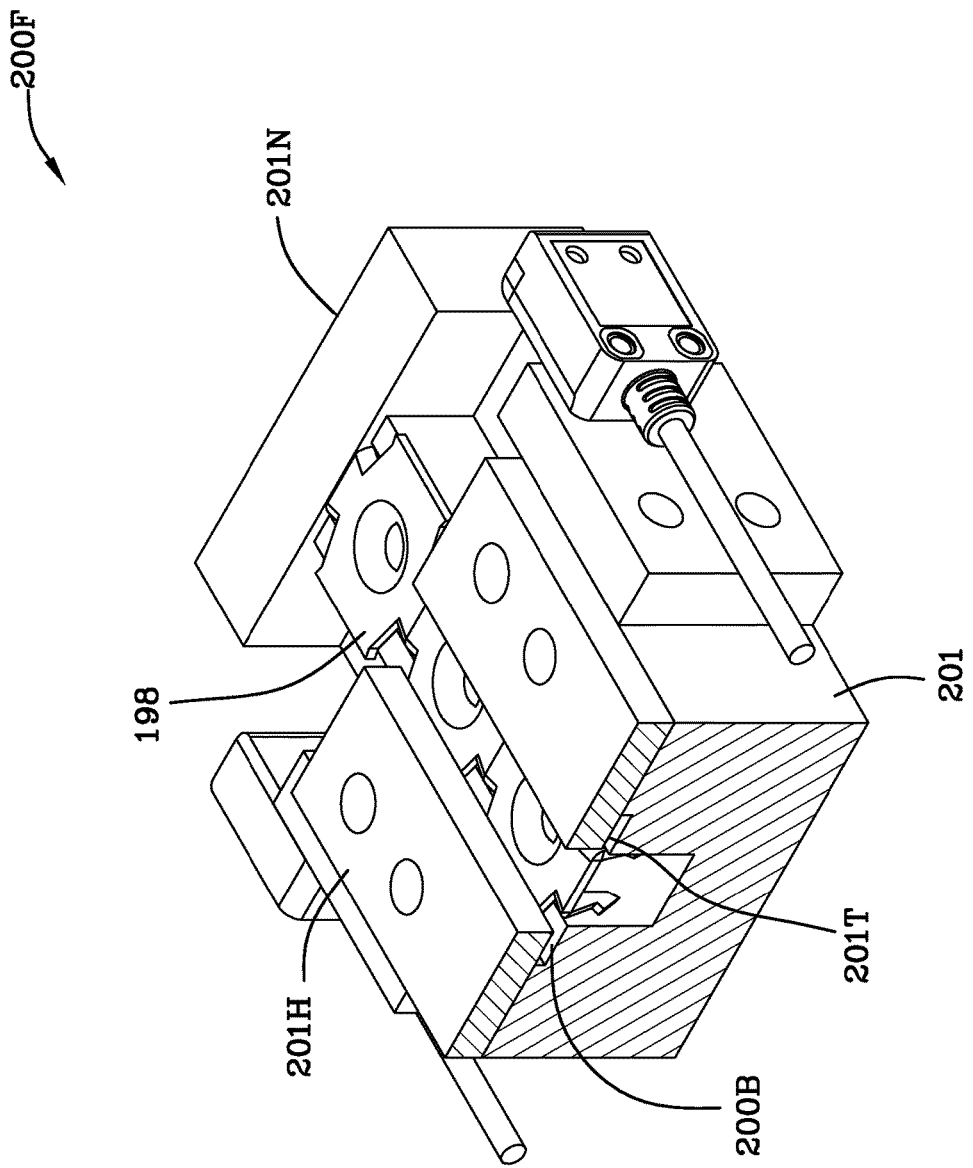
FIG. 2F is a cross-sectional and perspective view of the escapement illustrated in FIG. 2C taken along the lines 2F-2F illustrated in FIG. 2C.
Figure 2G:
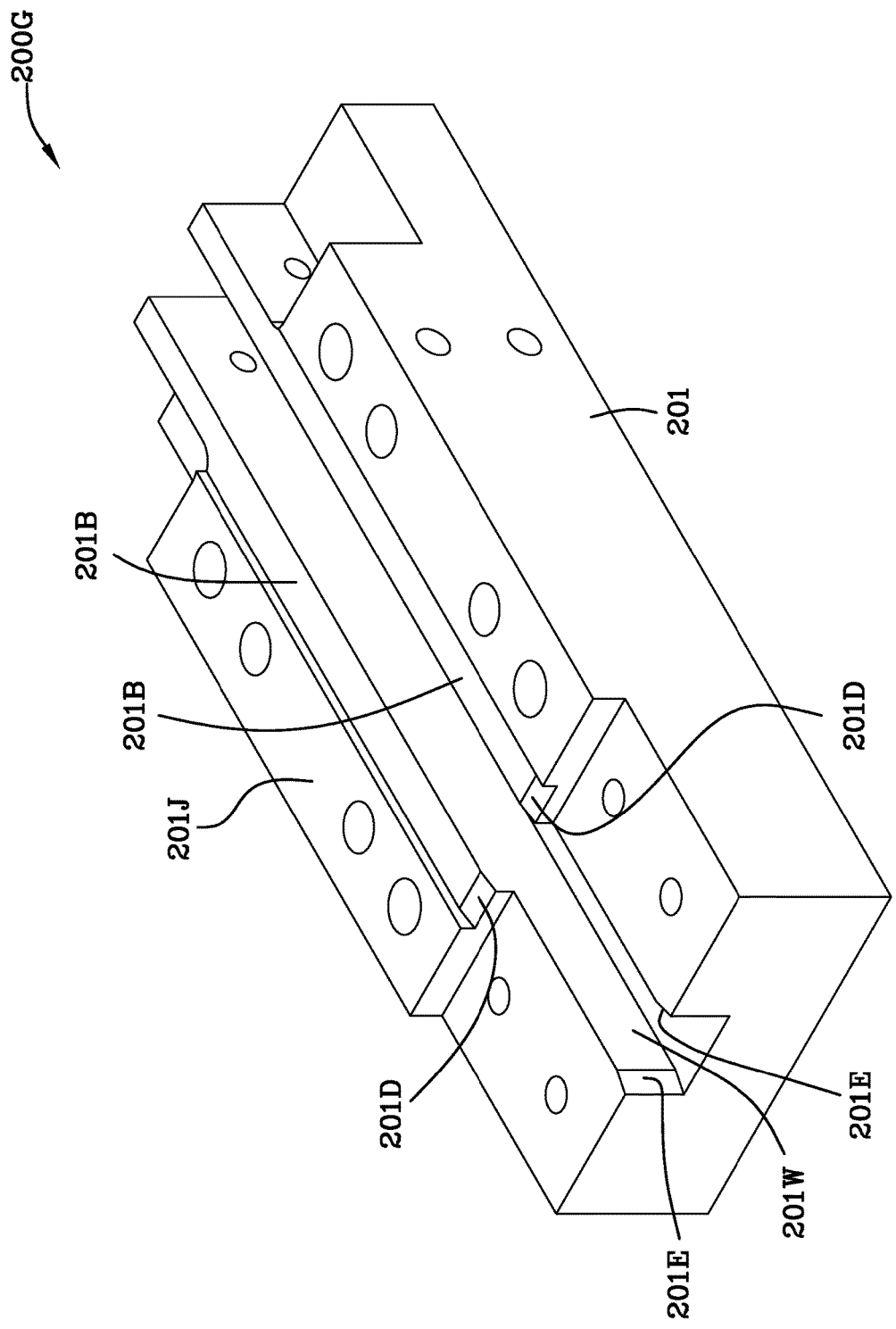
FIG. 2G is a perspective view of the base portion of the escapement illustrated in FIG. 2C.
Figure 2H:
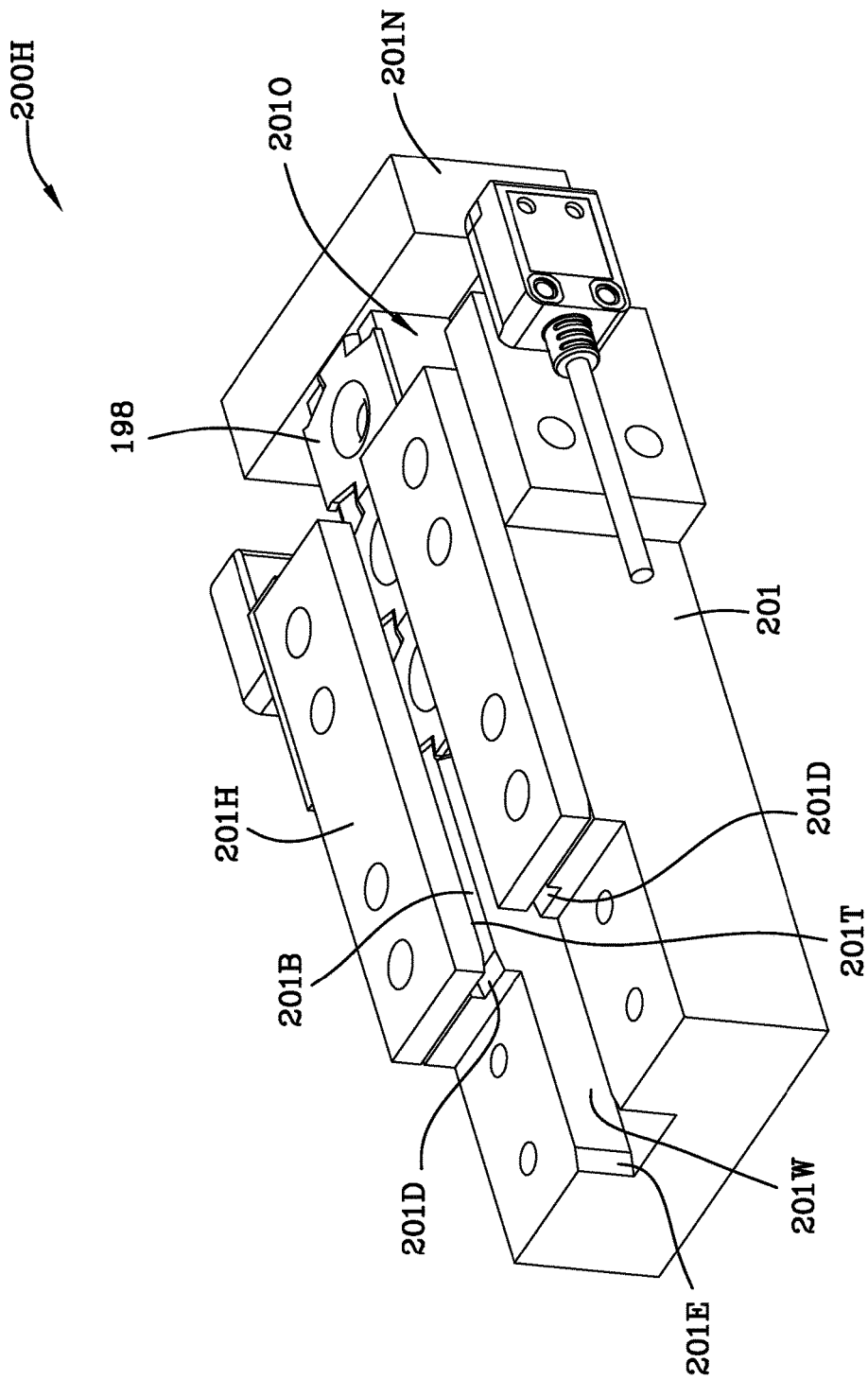
FIG. 2H is another perspective view of the escapement illustrated in illustrated in FIG. 2C.

FIG. 2C is a perspective view 200C of the escapement 108E, FIG. 2D is a cross-sectional view 200D of the escapement illustrated in FIG. 2C taken along the lines 2D-2D, FIG. 2E is a cross-sectional view 200E of the escapement illustrated in FIG. 2C taken along the lines 2E-2E, FIG. 2F is a cross-sectional view 200F of the escapement illustrated in FIG. 2C taken along the lines 2F-2F illustrated in FIG. 2C, FIG. 2G is a perspective view 200G of the base portion 201 of the escapement illustrated in FIG. 2C, and, FIG. 2H is another perspective view of the escapement illustrated in illustrated in FIG. 2C.

The roller press station 102 includes a first roller 103 and a second roller 104 which together form a roller press. The first and second rollers are separated from each other by a gap, G. The separation distance is adjustable. An idler gear 161 compensates for chain tension changes. The first roller 103 includes a first axis 103A and the second roller 104 includes a second axis 104A. The first axis 103A and the second axis 104A are parallel to each other. The first roller 103 is cylindrically shaped and includes a metal surface 103S and the second roller 104 is cylindrically shaped and includes a metal surface 104S. The metal surface 103S of the first roller 103 is spaced apart from the metal surface 104S of the second roller 104 by a gap G therebetween. The gap G is less than the thickness T of the substrate 101.

The conveyor system includes a first upstream portion 105 and a second downstream portion 105D. Substrates having pre-drilled holes 101H are placed on the first upstream portion as illustrated in FIG. 1. The conveyor 105 conveys the substrates 101 toward the roller station where the roller station grips the substrate and propels it through the roller station and onto the second downstream portion 105D.

The optical vision system 106 includes at least one camera 106C which communicates information with a computer system 301. The computer system, in turn, communicates information with the robot system 109. The robot system includes a motor driven arm 109A which pivots between first and second escapements 108E, 108E from which insertable fasteners are gripped and removed, and then the fasteners are transported to a location above the holes 101H of a particular substrate as the substrate is moving toward the roller press station 102.

The hopper feed system includes a bulk hopper 108A into which a large supply of insertable fasteners is poured or otherwise supplied, a rotating bowl 108B which includes tools to orient the insertable fasteners such that they will be accepted by the track 108T, and the track 108T is connected to the rotating bowl 109B and to an escapement 108E. The rotating bowl 108B is located elevationally above the escapement 108E such that gravity facilitates the flow of insertable fasteners. The bulk hopper 108A includes a plurality of the insertable fasteners 198 therein.

The bulk hopper 108A feeds the insertable fasteners into the bowl 108B. The bowl 108B is rotatable and orients the insertable fasteners 198 therein into alignment with the track 108T. The insertable fasteners slide down the track 108T into the escapement 108E. Insertable fasteners 198 are guided within the track by slot 202 which allows a portion of the fastener to protrude therefrom. Preferably, the insertable fastener is a T-Nut 198 which includes a flange 198F, a cylindrical barrel portion 198B, prongs 198P, and a flat edge 198E. The barrel may include internal threads 198T therein for interconnection with another threaded member which is not shown. This allows the substrate 101 to be affixed to another support element. Support elements made of wood and other materials are used in the furniture industry to assemble the frame of furniture.

The robot system 109 includes a rotating arm 109A and a gripper 109G attached to the rotating arm 109A. The gripper 109G also moves vertically for lifting and removing the insertable fastener from the escapement by gripping edges 198E, 198E from the escapement. The gripper 109G is then moved in proximity to a hole 110H in the board and then released such that a portion of the barrel of the T-Nut fastener resides in a hole 110H. When the gripper positions the fastener 198 it is moving as is the substrate 101 on the first portion 105 of the conveyor system.

Substrate 101 moves relative to the hopper feed system 108 and the vision system 106. The vision system 106 includes a plurality of cameras 106C which view the substrate 101, and, then transmit the information from the cameras to the computer system 301 wherein it is processed. The computer 301 then commands the robot system to obtain an insertable fastener from the appropriate escapement 108E and then positions the barrel of the insertable fastener 198 in one of the plurality of holes 101H of the substrate 101. The gripper 109G of the robot system transports the insertable fastener 198 according to a command of the computer system. The computer system receives information from the cameras of the optical system and generates a movement command.

The gripper 109G of the robot system transports the insertable fastener 198 according to the movement command of the computer system. The gripper 109G of the robot system partially inserts the insertable fastener 198 in the hole 101H of the substrate 101. The first portion 105 of the conveyor drives the substrate toward and into the roller press 102.

Referring to FIG. 4B, the first roller 103 and the second roller 104 rotate in opposite directions as indicated by arrows R1, R2 engaging the substrate 101 and slightly compressing the substrate 101 as it is driven through the roller press station 102 as indicated by arrow D. See FIG. 4B. As the substrate 101 exits the first 103 and the second rollers 104, the substrate is propelled onto the second portion 105D of the conveyor system for transport away from the roller press station 102. An operator removes the processed substrate from the apparatus.

Preferably the first and second rollers include metal surfaces made of stainless steel. The roller construction is cylindrical in form and may be internally supported by a variety of structures. Preferably the substrate is selected from the group consisting of wood, plywood, chipboard, oriented strand board, frame grade plywood, and plastic. Preferably the track is arranged vertically and a plurality of insertable fasteners are vertically stacked exerting pressure on the endmost insertable fastener in the escapement.

The first roller and the second roller are sized based on the thickness of the substrate so as to press the t-nuts into the substrate. FIG. 3G is a schematic illustration 300G of the first, lower roller 103 and the second, upper roller 104 and their respective axes 103A, 104A. FIG. 3H is a side view of FIG. 3G illustrating the adjustable gap G between the first, lower roller 103 and the second, upper roller 104. The upper roller 104 is moved with respect to the lower roller 103 to adjust the gap, G, between the rollers. The lower roller 103 does not move as it is fixed. The gap G is adjustable to accommodate substrates having different thicknesses. Idler gear 166 is used to facilitate adjustment of the roller gap, G.

Typically, the radius R of rollers 103, 104 is 8 inches, however 6 inches is suitable for many applications. The larger the radius, R, of the cylindrical rollers, the better for pressing the T-Nuts into the substrate as there are fewer T-Nuts kicked out of the holes 101H. In other words, a small diameter roller approaches the T-Nuts more horizontally than does a larger diameter roller. The larger diameter roller approaches the T-Nuts 198 more vertically for pressing the T-Nuts in the substrate.

The escapement comprises: a flange slot 201S and a prong slot 201P for guiding the prongs of the insertable fasteners between a first end portion and a second end portion, a base portion 201, and, an upper portion 201H. The base portion 201 includes: a prong slot 201P therein extending between the first end portion and the second end portion, the slot comprises a first prong guide wall and a second prong guide wall, and the first prong guide wall 201W and the second prong guide wall 201W slidingly guide prongs of the insertable fastener 198 therein; the prong slot includes a beveled opening 201E in the first end portion which facilitates entry of the prongs 198P of the insertable fasteners 198; the flange slot 201S includes a beveled opening 201D in said first end portion which facilitates entry of the flange 198F of the insertable fasteners 198; and, the base portion includes an upper surface 201J and a bottom surface 201B of a flange slot 201S.

The upper portion includes a bottom surface 201T and a top surface, the bottom surface 201T is affixed to the upper surface 201J and forms the flange slot 201S. An end portion 201N is affixed to the second portion of the escapement. The end portion 201N abuts the first prong guide wall 201W and the second prong guide wall 201W.

The second end portion of said base portion includes a first notch 201K and a second notch 201M therein. The first notch 201K and the second notch 201M provide an opening for the gripper of the robot to engage the insertable fasteners 198.

An insertable fastener installation method using pre-drilled 101H substrates includes the steps of:

an insertable fastener installation apparatus operator places the pre-drilled substrates 101 on a conveyor belt 105, the substrates 101 must be placed sequentially on the conveyor one at a time and must not overlap each other;

advancing the substrates 101 through an entrance passageway of the safety enclosure and passing the substrates under a vision system 106 using a conveyor;

utilizing the vision system 106 and a computer 301, recognizing and recording the presence of pre-drilled holes 101H in the substrates;

gripping an insertable fastener 198 from an escapement 108E using a pneumatic gripper 109G;

placing a portion of each of the insertable fasteners 198 into the pre-drilled holes 101H of the substrate and approximately centering the barrel portion 198B of insertable fasteners into the pre-drilled holes 101H without pressing the insertable fastener 198 into the substrate 101;

passing the substrates 101 and the insertable fasteners 198 through a roller press station 102 wherein the insertable fasteners 198 are inserted into the substrate 101; and, expelling the substrates from the safety enclosure on a discharge conveyor 105D.

Further, the step of passing the substrates 101 and the insertable fasteners through a roller press station 102 includes compressing the substrate 101. See FIG. 4C.

The foregoing detailed description will be better explained when reference is made to the following drawings.

Figure 1A:
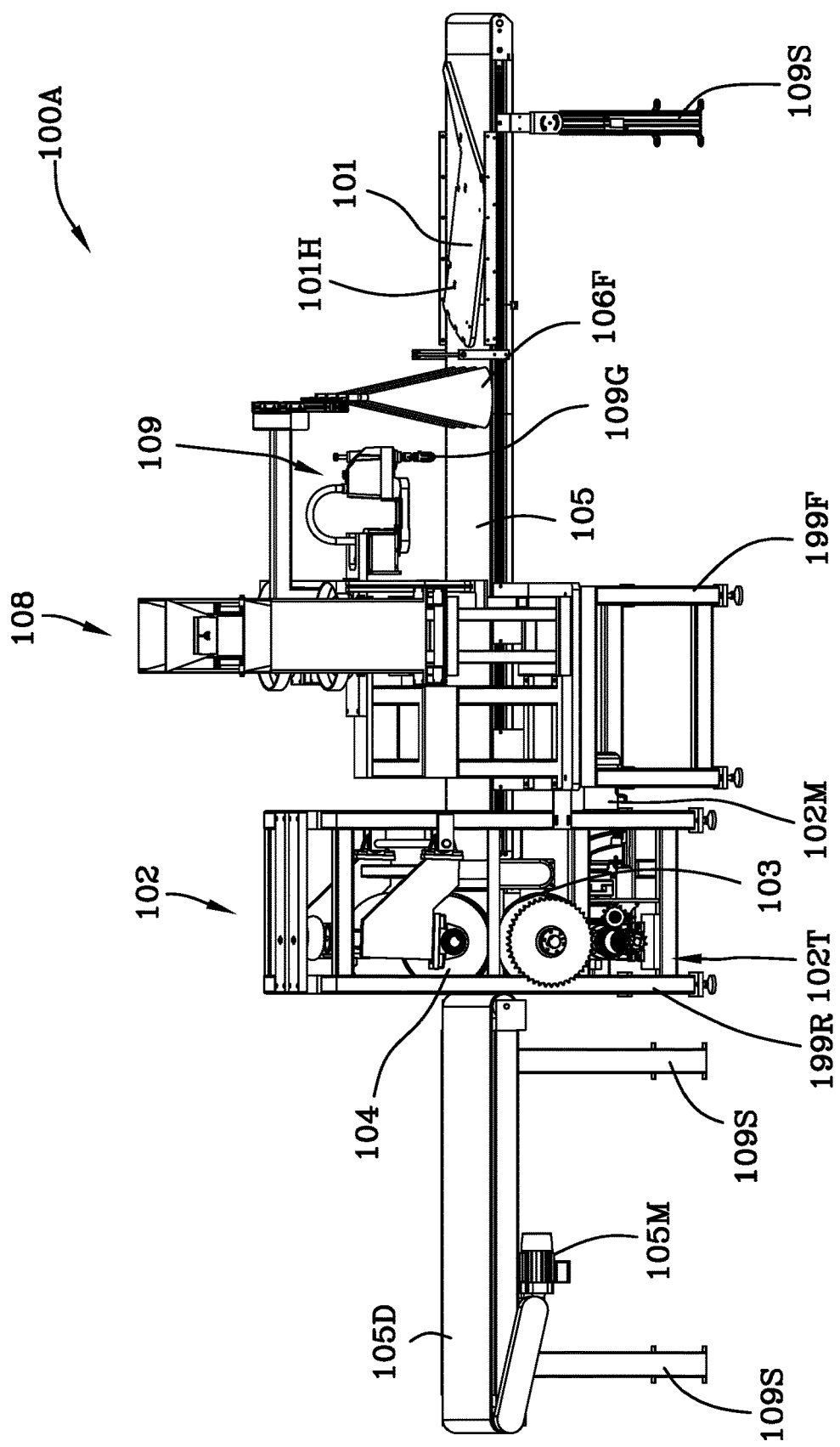
FIG. 1A is a side view of the insertable fastener installation apparatus.
Figure 1B:
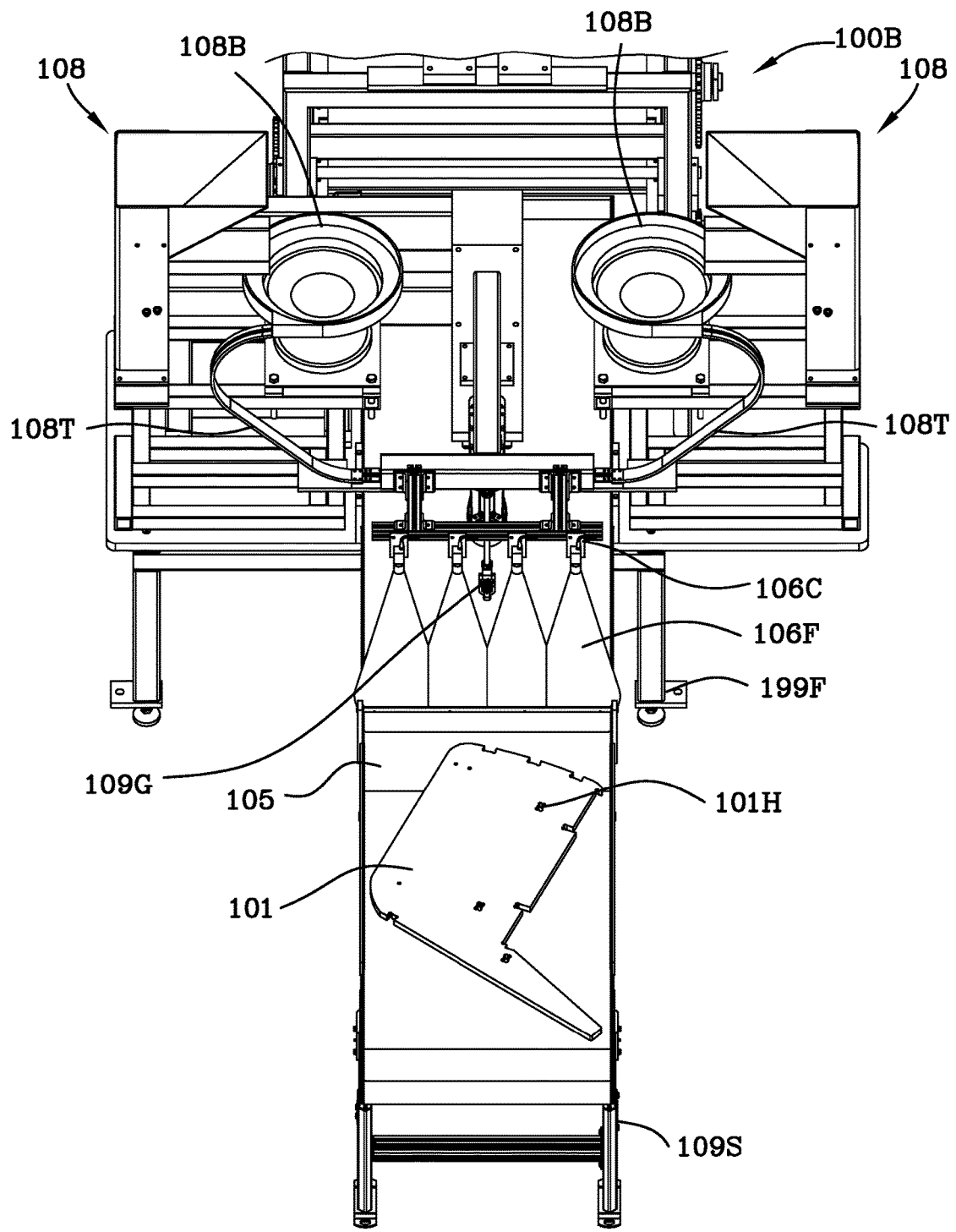
FIG. 1B is a top perspective view of a portion of the insertable fastener installation apparatus illustrating the rotatable vibrating bowls and the tracks leading from the bowls to respective escapements.
Figure 1C:
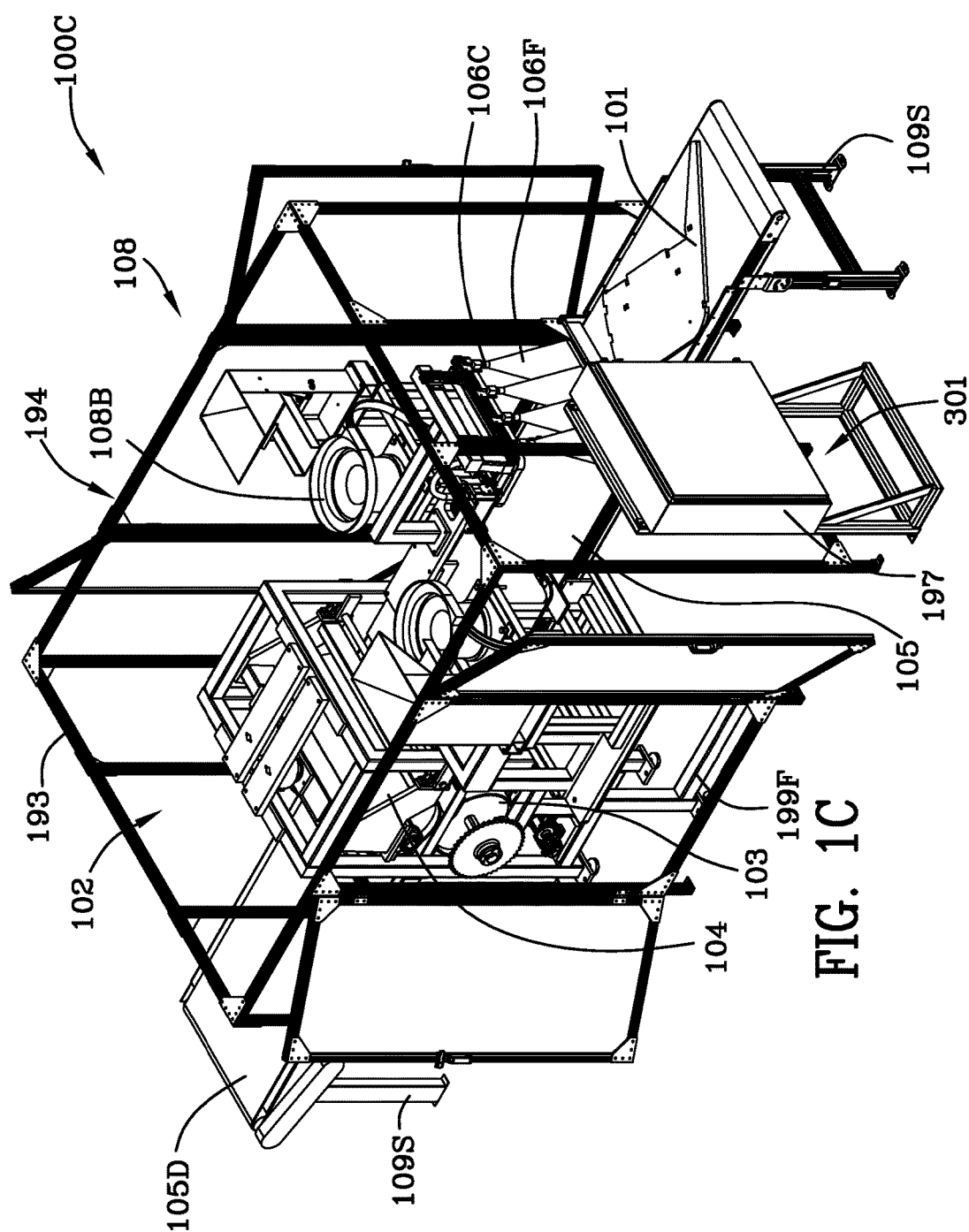
FIG. 1C is a view of the safety enclosure around the insertable fastener installation apparatus.

FIG. 1 is a top perspective view 100 of the insertable fastener installation apparatus supported by frame members 199F, 109. FIG. 1A is a side view 100A of the insertable fastener installation apparatus. FIG. 1B is a top perspective view 100B of a portion of the insertable fastener installation apparatus illustrating the rotatable vibrating bowls 108B, 108B and the tracks 108T, 108T leading from the bowls to respective escapements 108E, 108E. FIG. 1C is a view 100C of the safety enclosure 194 around the insertable fastener installation apparatus.

FIG. 2 is a top perspective view 200 of a portion of the insertable fastener installation apparatus illustrating the cameras 106C, the robot pick and place system 109, the tracks 108T, 108T and their respective escapements 108E, 108E. Two escapements 108E, 108E are used as illustrated in FIG. 2 to enable the robot system to work faster since a T-Nut will be removed from the escapement closest to the hole 101H into which the barrel 198B of the T-Nut is inserted. FIG. 2A is an enlargement 200A of a portion of FIG. 2 illustrating the cameras 106C, the robot pick and place system 109, the tracks 108T, 108T and their respective escapements 108E, 108E.

Figure 2I:
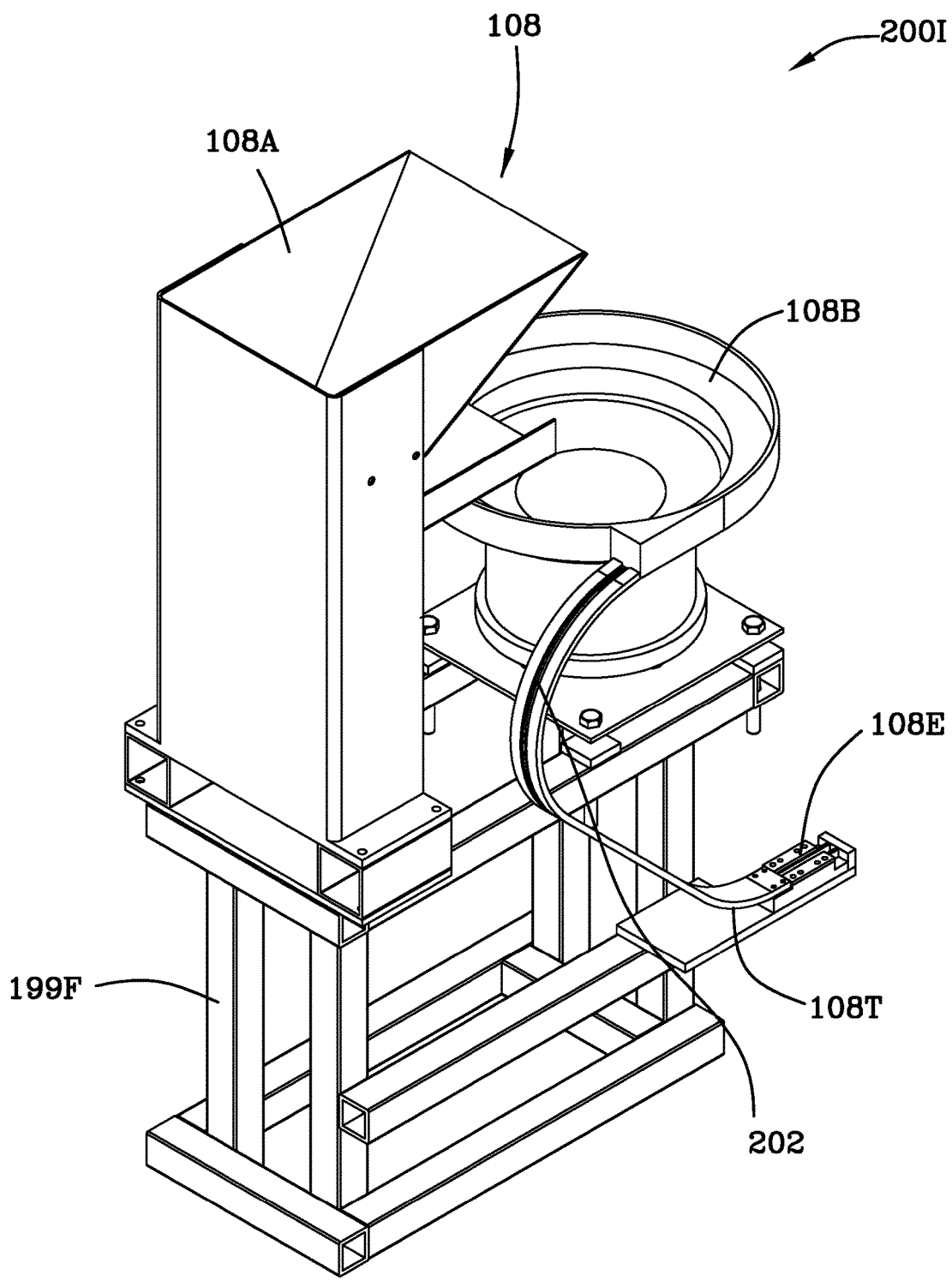
FIG. 2I is a enlarged perspective view of a T-nut hopper, a rotating vibratory bowl, a track and an escapement.
Figure 2J:
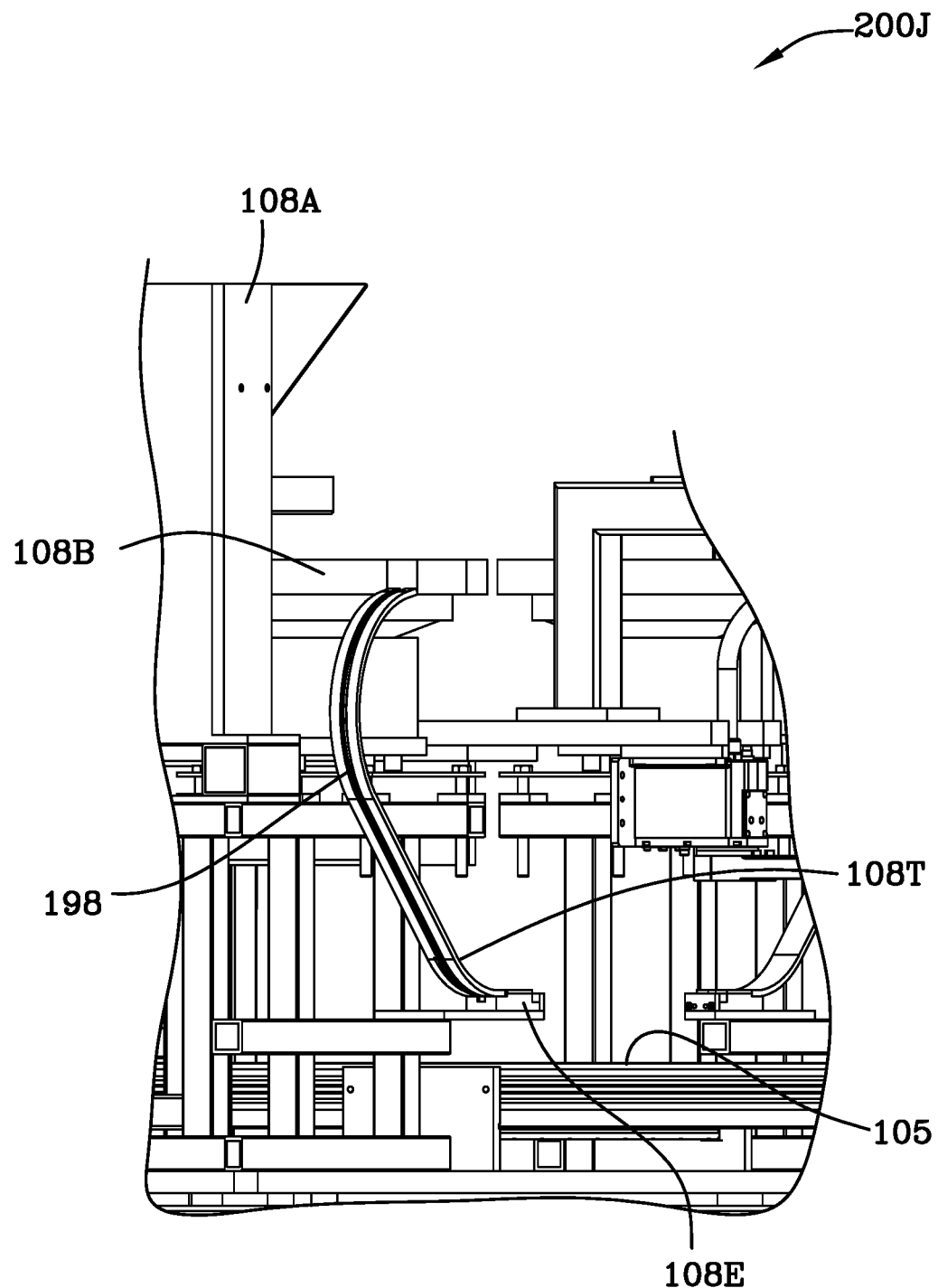
FIG. 2J is a perspective view of a portion of the insertable fastener installation apparatus illustrating a T-nut hopper, a rotating vibratory bowl, a track with T-nuts therein, and an escapement illustrated in FIG. 1.
Figure 2K:
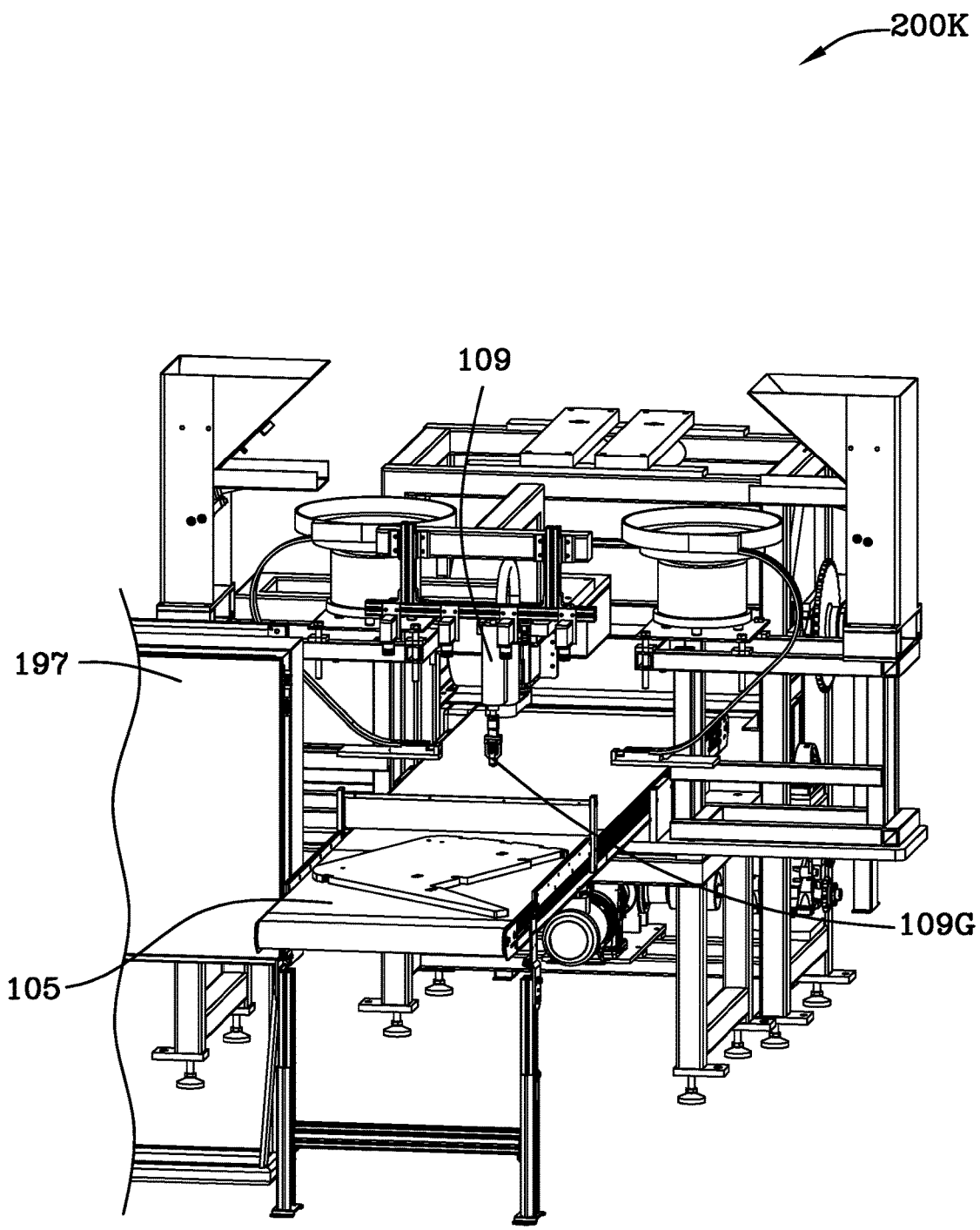
FIG. 2K is a perspective view of a portion of the insertable fastener installation apparatus illustrating the camera system and the pick and place robotic system illustrated in FIG. 1.

FIG. 2B is a perspective view 200B of the robotically operated gripper 109G with a T-Nut being gripped by edges 198E, 198E. Gripper 109G includes clamps with slots 109S, 109S. Alternatively, a gripper can be used which does not include slots for receiving the edges of the T-Nuts. FIG. 2I is a enlarged perspective view 200I of a T-nut hopper 108A, a rotating vibratory bowl 108B, a track 108T and an escapement 108E. FIG. 2J is a perspective view 200J of a portion of the insertable fastener installation apparatus illustrating a T-nut hopper 108A, a rotating vibratory bowl 108B, a track 108T with T-nuts therein, and an escapement 108E. FIG. 2K is a perspective view 200K of a portion of the insertable fastener installation apparatus illustrating the camera system and the pick and place robotic system 109.

Figure 2M:
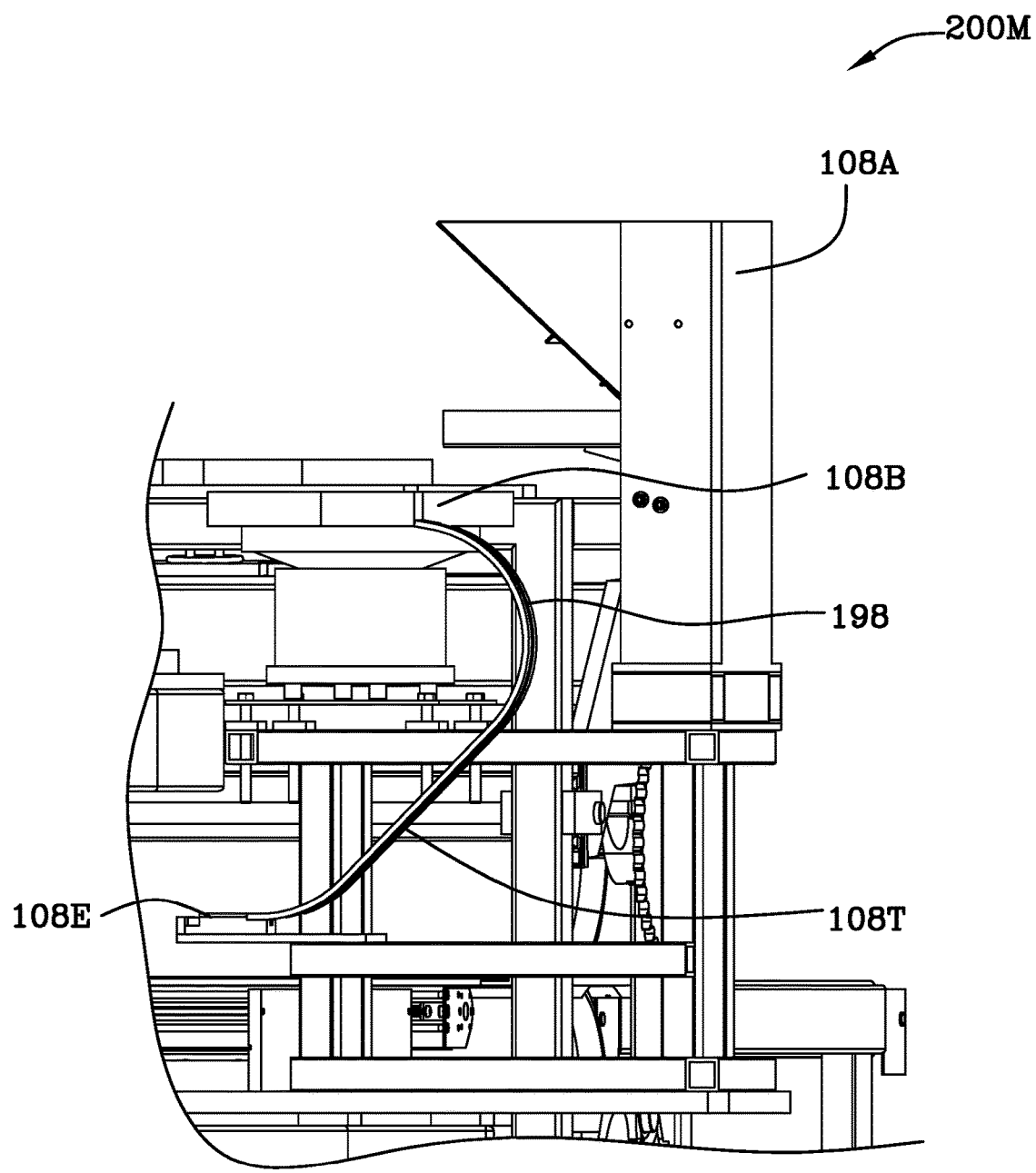
FIG. 2M is another perspective view of a portion of the insertable fastener installation apparatus illustrating a T-nut hopper, a rotating vibratory bowl, a track with T-nuts therein, and an escapement.

FIG. 2L is an enlarged perspective view 200L of a portion of the insertable fastener installation apparatus Illustrating the camera system 106C and the pick and place robotic system 109. FIG. 2M is another perspective view 200M of a portion of the insertable fastener installation apparatus illustrating a T-nut hopper 108A, a rotating vibratory bowl 108B, a track 108T with T-nuts therein, and an escapement 108E.

Figure 3:
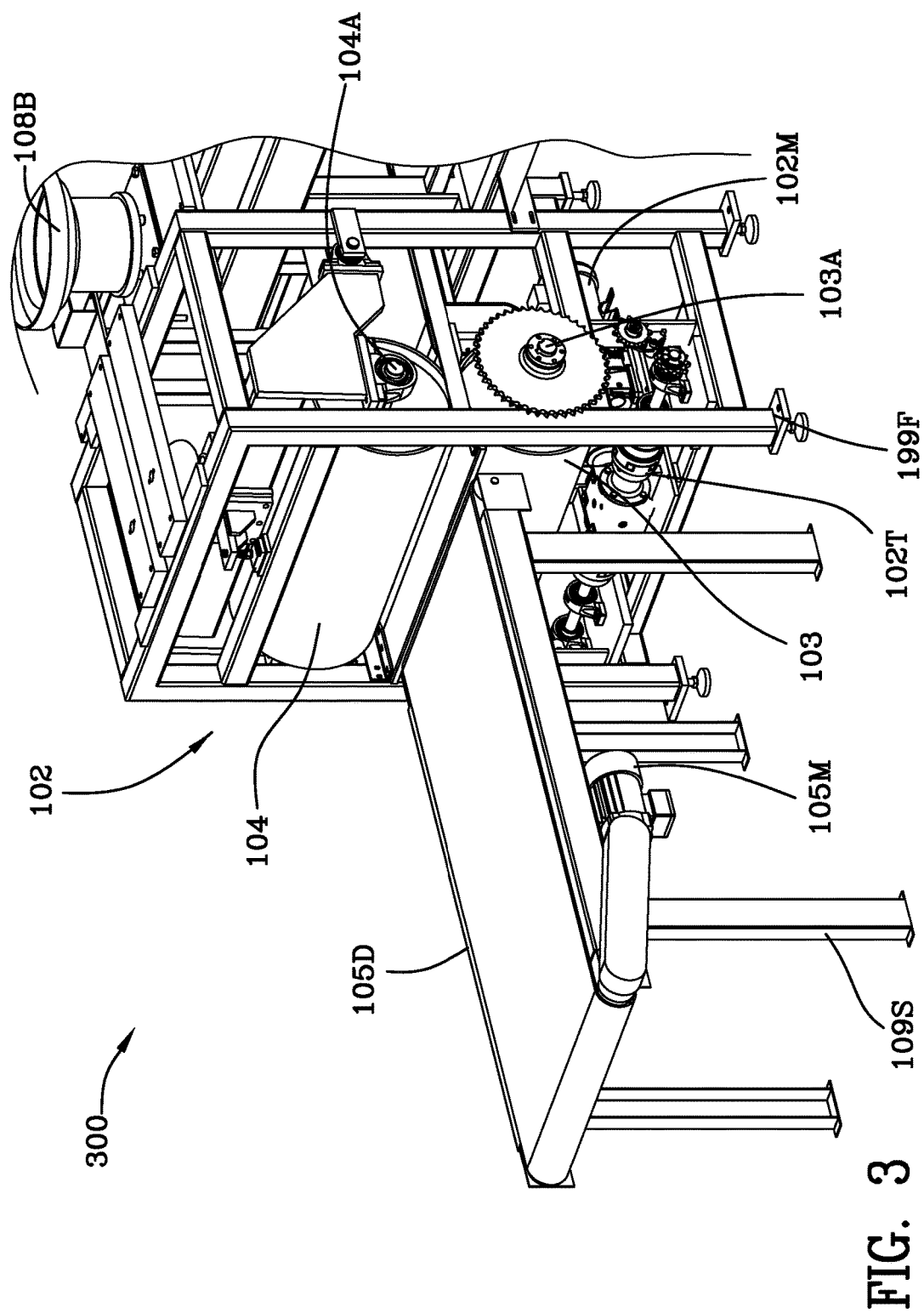
FIG. 3 is a perspective view of a portion of the insertable fastener installation apparatus illustrating the roller press station and a discharge portion of the conveyor system.
Figure 3A:
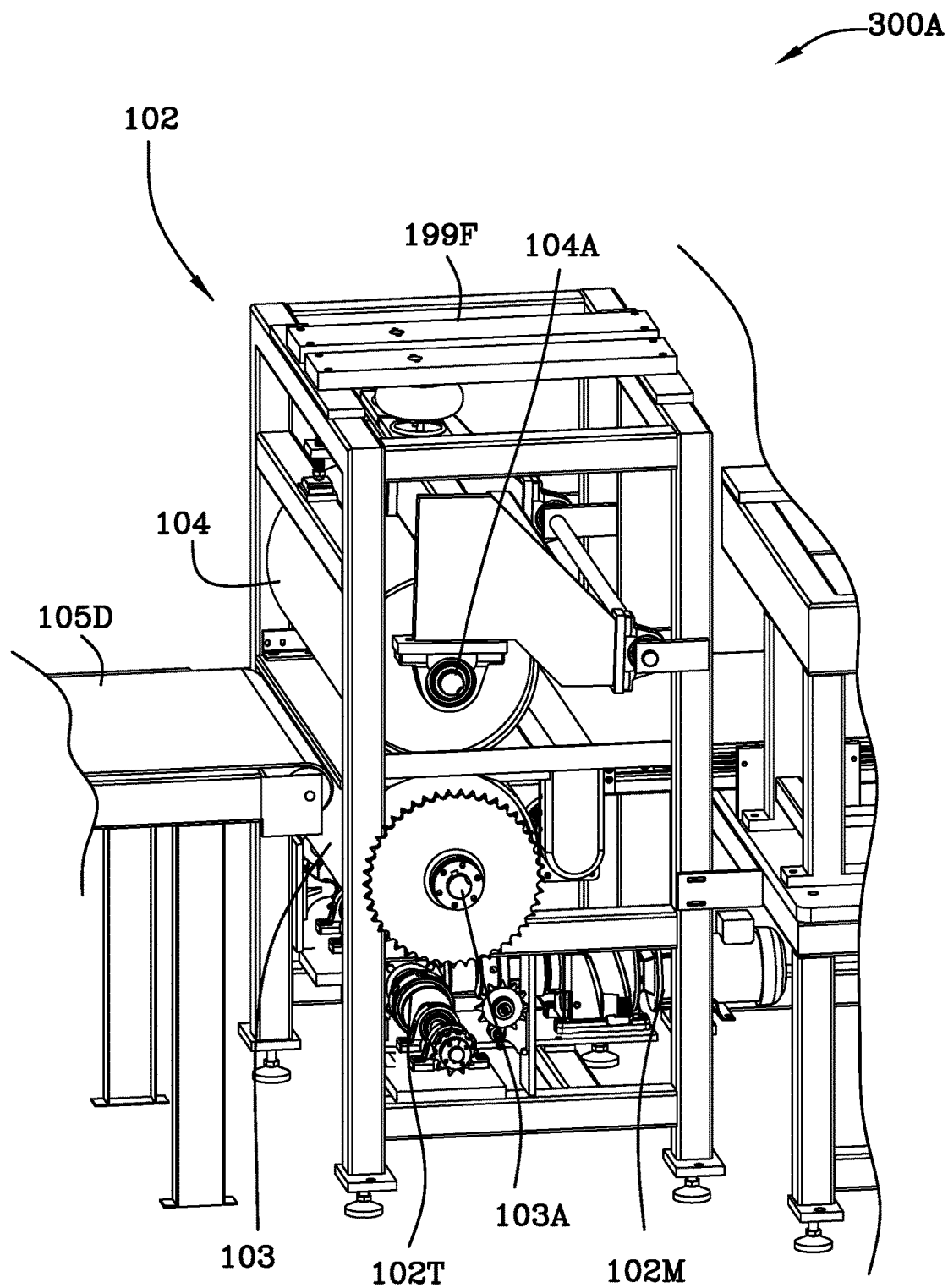
FIG. 3A is another perspective view of a portion of the insertable fastener installation apparatus illustrating the roller press station and a discharge portion of the conveyor system.
Figure 3B:
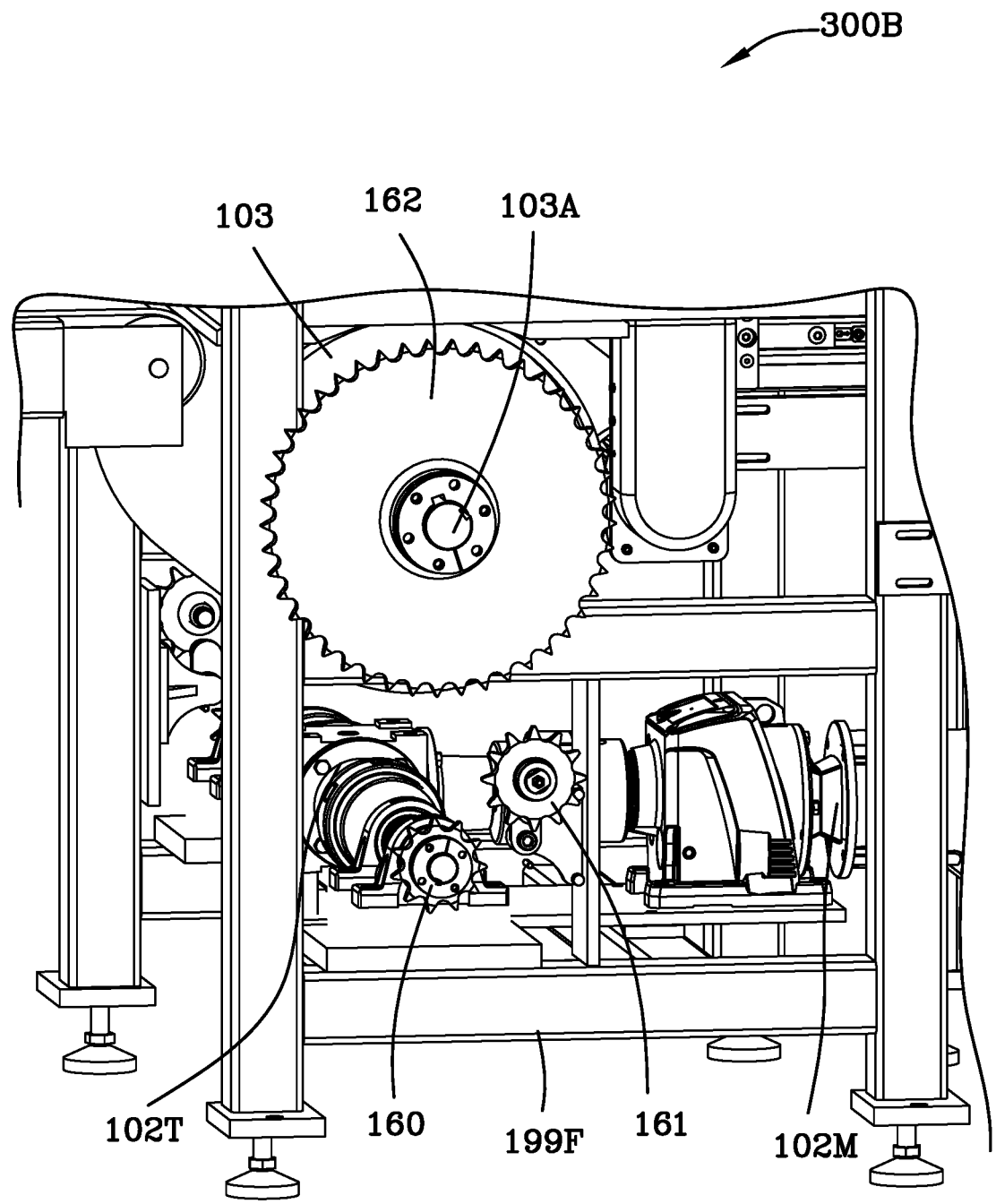
FIG. 3B is another perspective view of a portion of the insertable fastener installation apparatus illustrating a portion of the drive system of the roller press station.
Figure 3C:
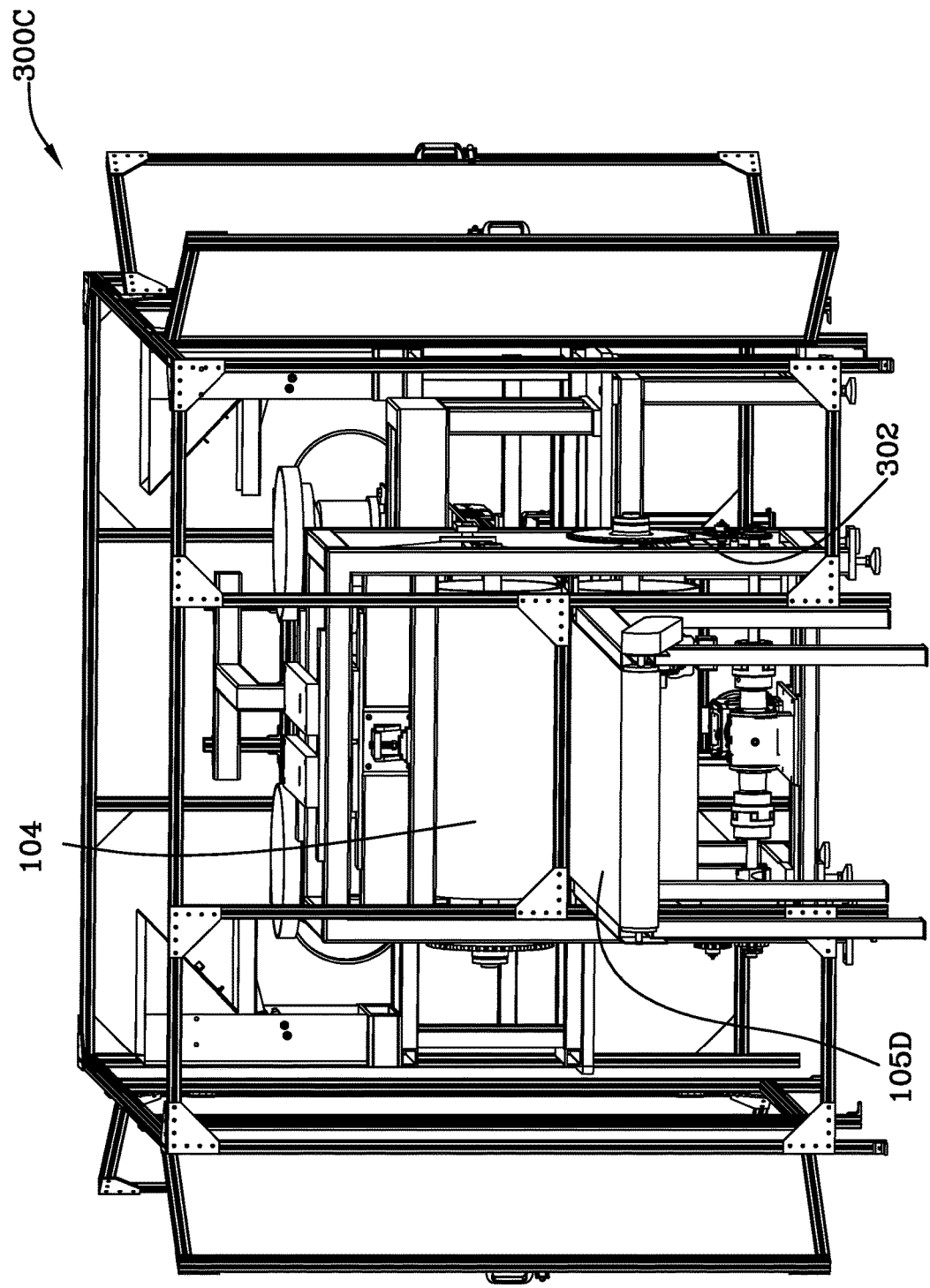
FIG. 3C is another view of a portion of the insertable fastener installation apparatus illustrating the drive system of the first, lower roller of the roller press station.

FIG. 3 is a perspective view 300 of a portion of the insertable fastener installation apparatus illustrating the roller press station 102 and a discharge portion 105D of the conveyor system. Still referring to FIG. 3, the motor 102M and transmission 102T which drive the rollers are illustrated. FIG. 3A is another perspective view 300A of a portion of the insertable fastener installation apparatus illustrating the roller press station 102 and a discharge portion 105D of the conveyor system. Referring to FIGS. 3 and 3A, motor 105M drives conveyor 105D. FIG. 3B is another perspective view 300B of a portion of the insertable fastener installation apparatus illustrating a portion of the drive system of the roller press station 102. FIG. 3C is another view 300C of a portion of the insertable fastener installation apparatus illustrating the drive system 102M, 102T and associated gearing 160, 161, 162 of the first, lower roller of the roller press station 102.

Figure 3D:
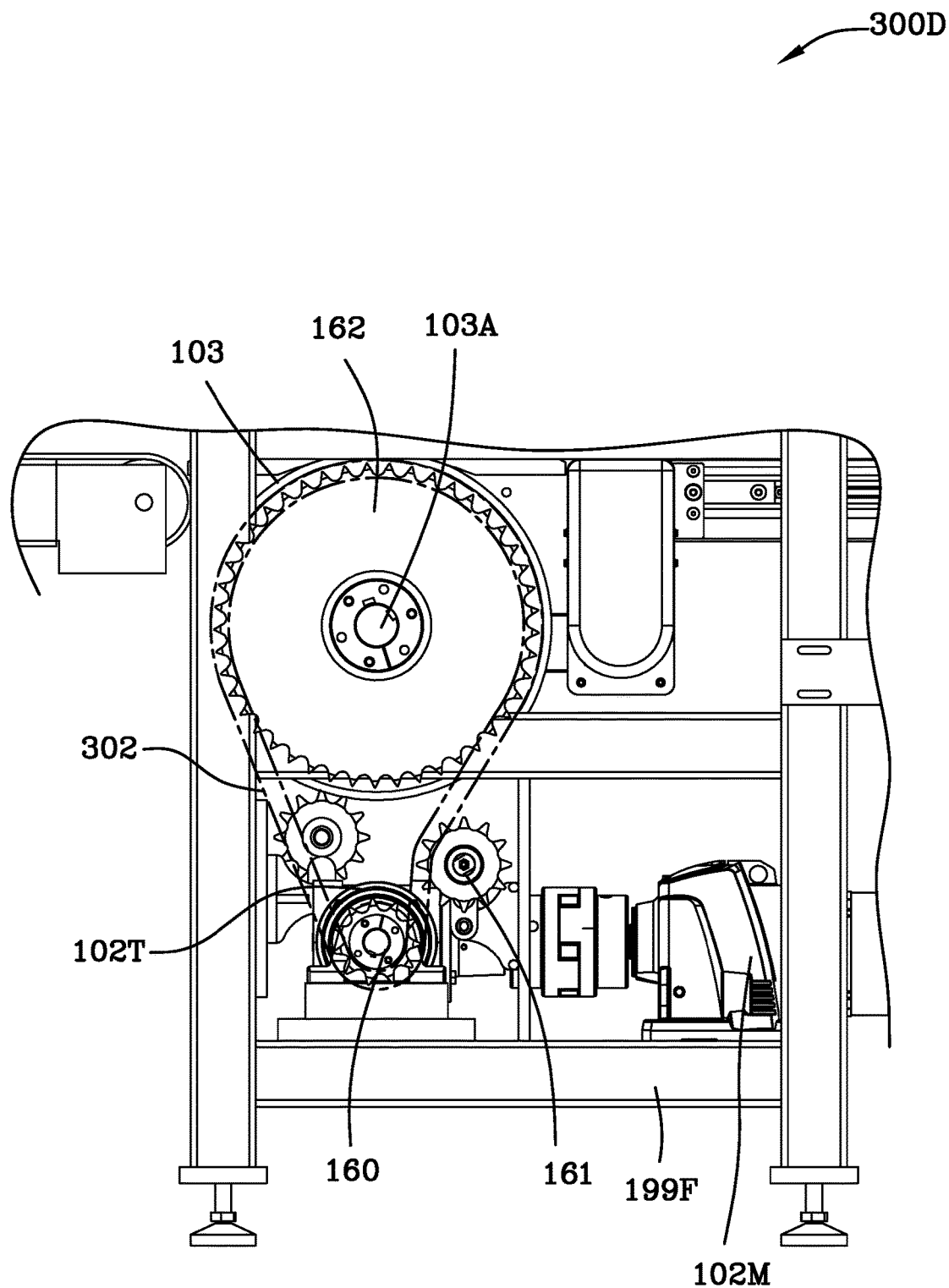
FIG. 3D is yet another view of a portion of the insertable fastener installation apparatus illustrating the drive system of the first, lower roller of the roller press station.
Figure 3E:
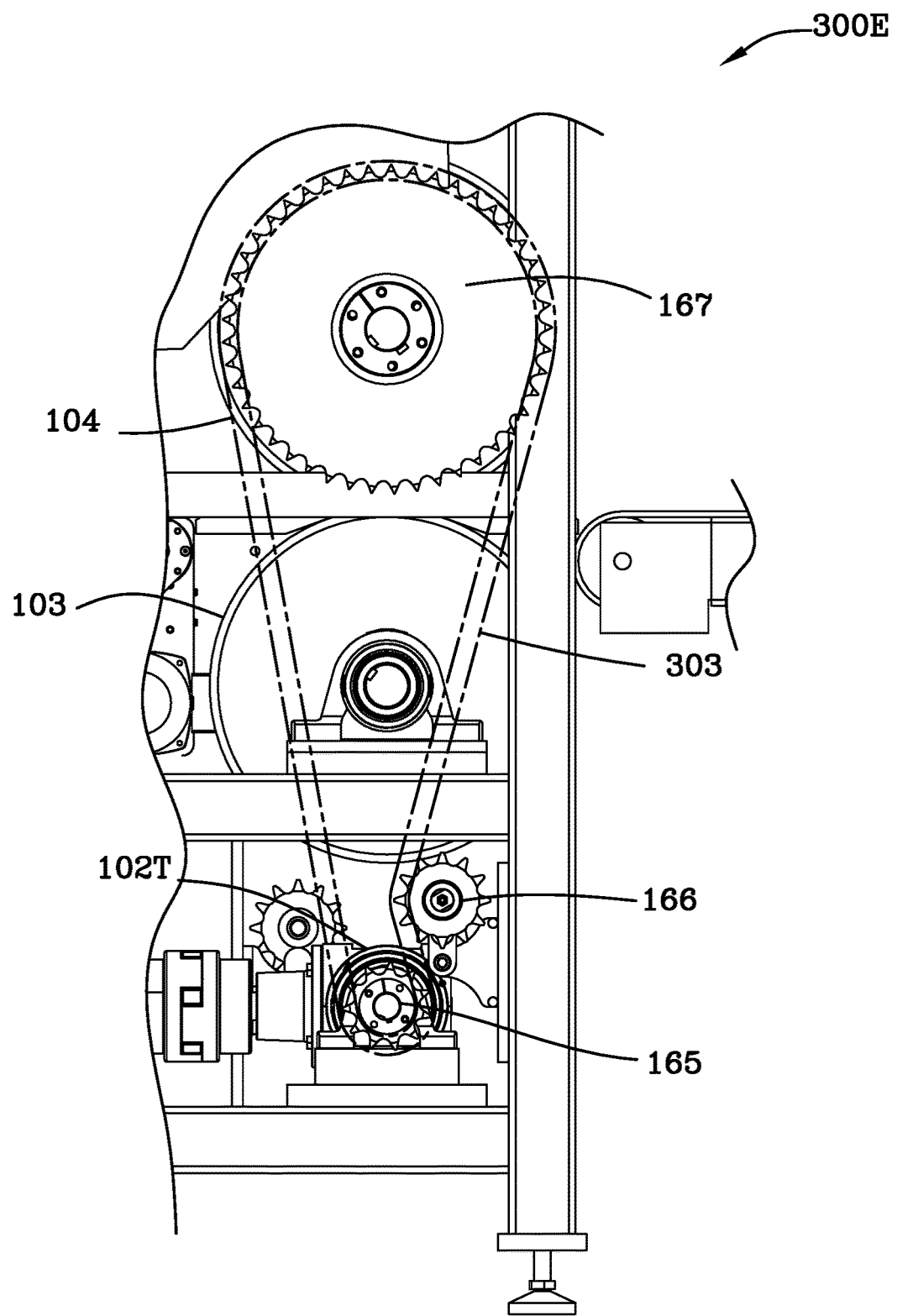
FIG. 3E is yet another view of a portion of the insertable fastener installation apparatus illustrating a portion of the drive system of the second, upper roller of the roller press station.

FIG. 3D is yet another view 300D of a portion of the insertable fastener installation apparatus illustrating the drive system of the first, lower roller 103 of the roller press station 102. FIG. 3D illustrates idler gear 161. FIG. 3E is yet another view 300E of a portion of the insertable fastener installation apparatus illustrating a portion 102T and associated gearing 165, 166, 167 of the drive system of the second, upper roller 104 of the roller press station 102.

Figure 3F:
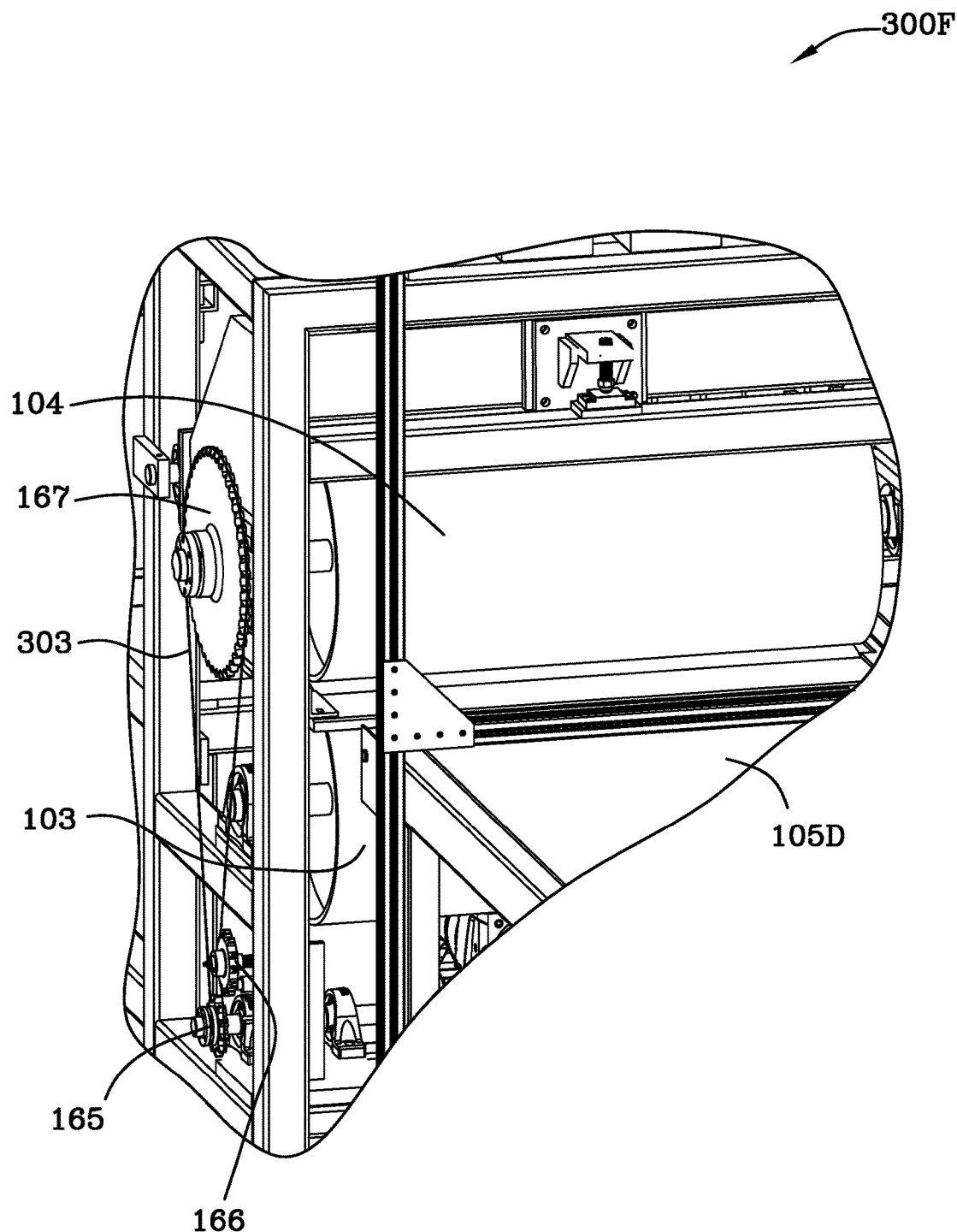
FIG. 3F is yet another view of a portion of the insertable fastener installation apparatus illustrating the drive system of the second, upper roller of the roller press station and a portion of the drive system.
Figure 3G:
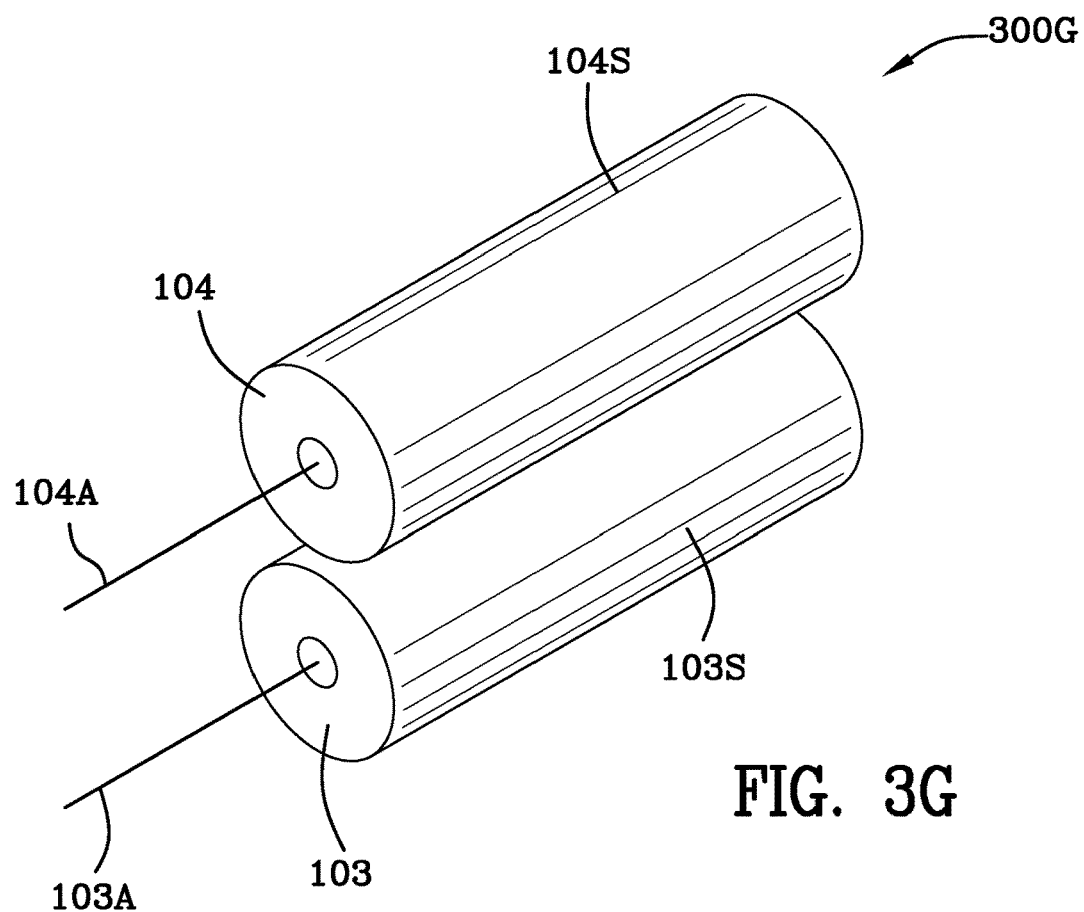
FIG. 3G is a schematic illustration of the first, lower roller and the second, upper roller and their respective axes.
Figure 3H:
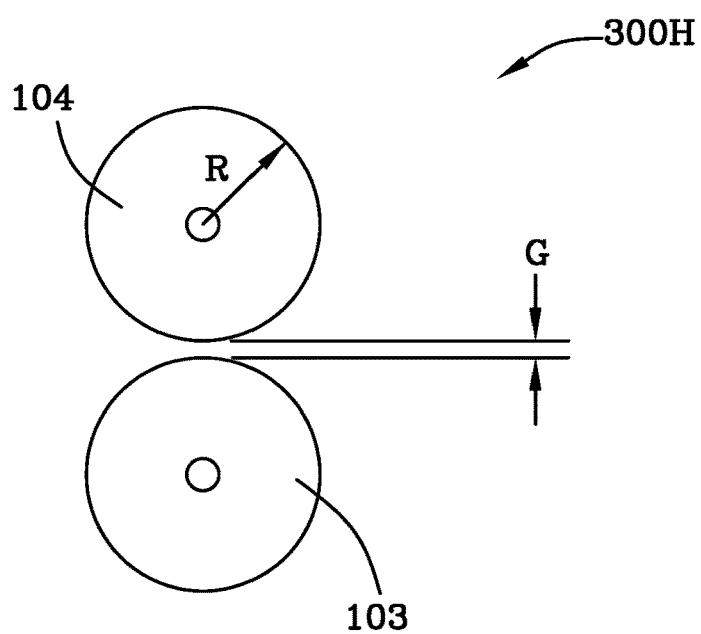
FIG. 3H is a side view of FIG. 3G illustrating the adjustable gap between the first, lower roller and the second, upper roller.

FIG. 3F is yet another view 300F of a portion of the insertable fastener installation apparatus illustrating a portion 165, 166, 167 of the drive system of the second, upper roller 104 of the roller press station 102.

Figure 4A:
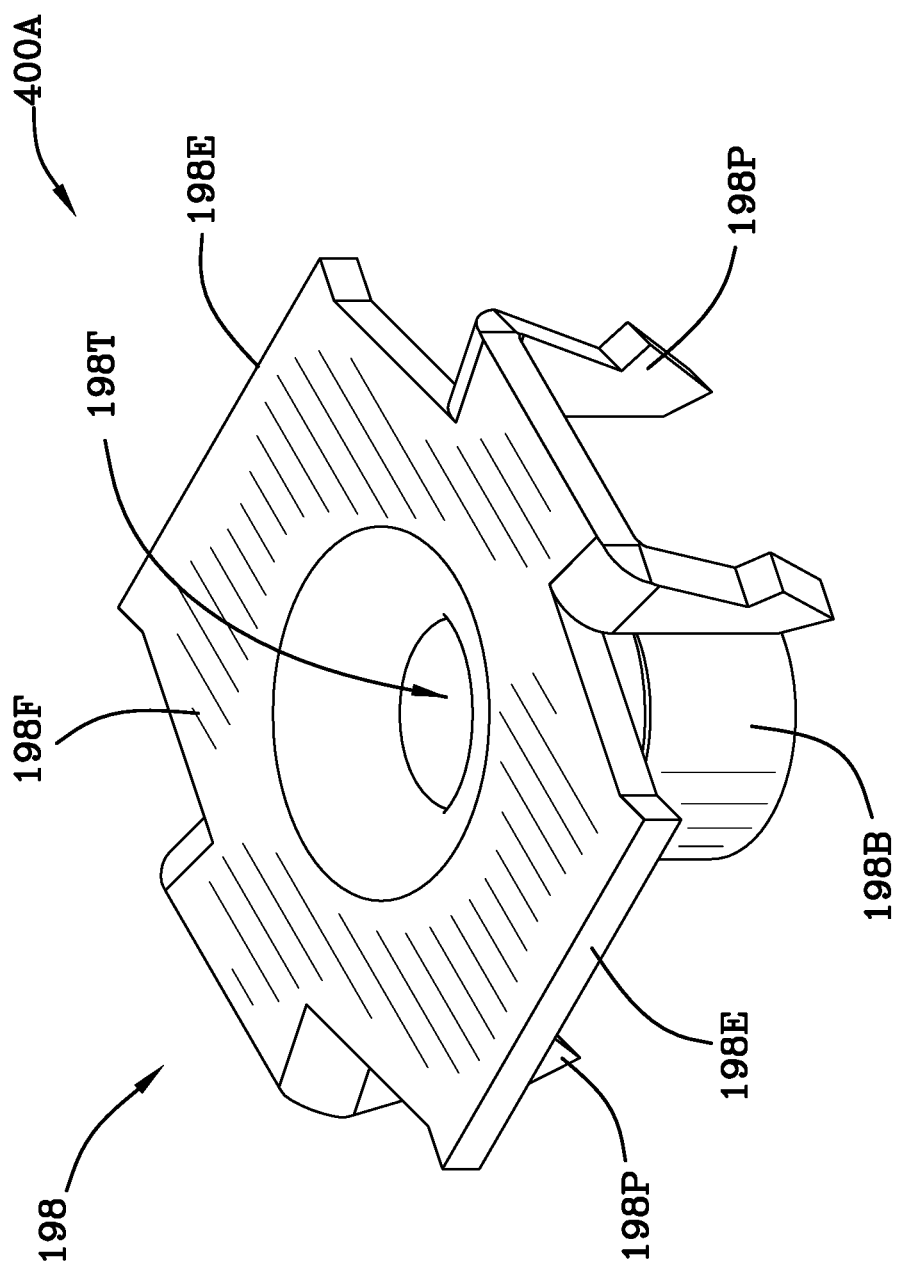
FIG. 4A is a T-Nut type of fastener illustrating prongs and a flange with edges shown.
Figure 4B:
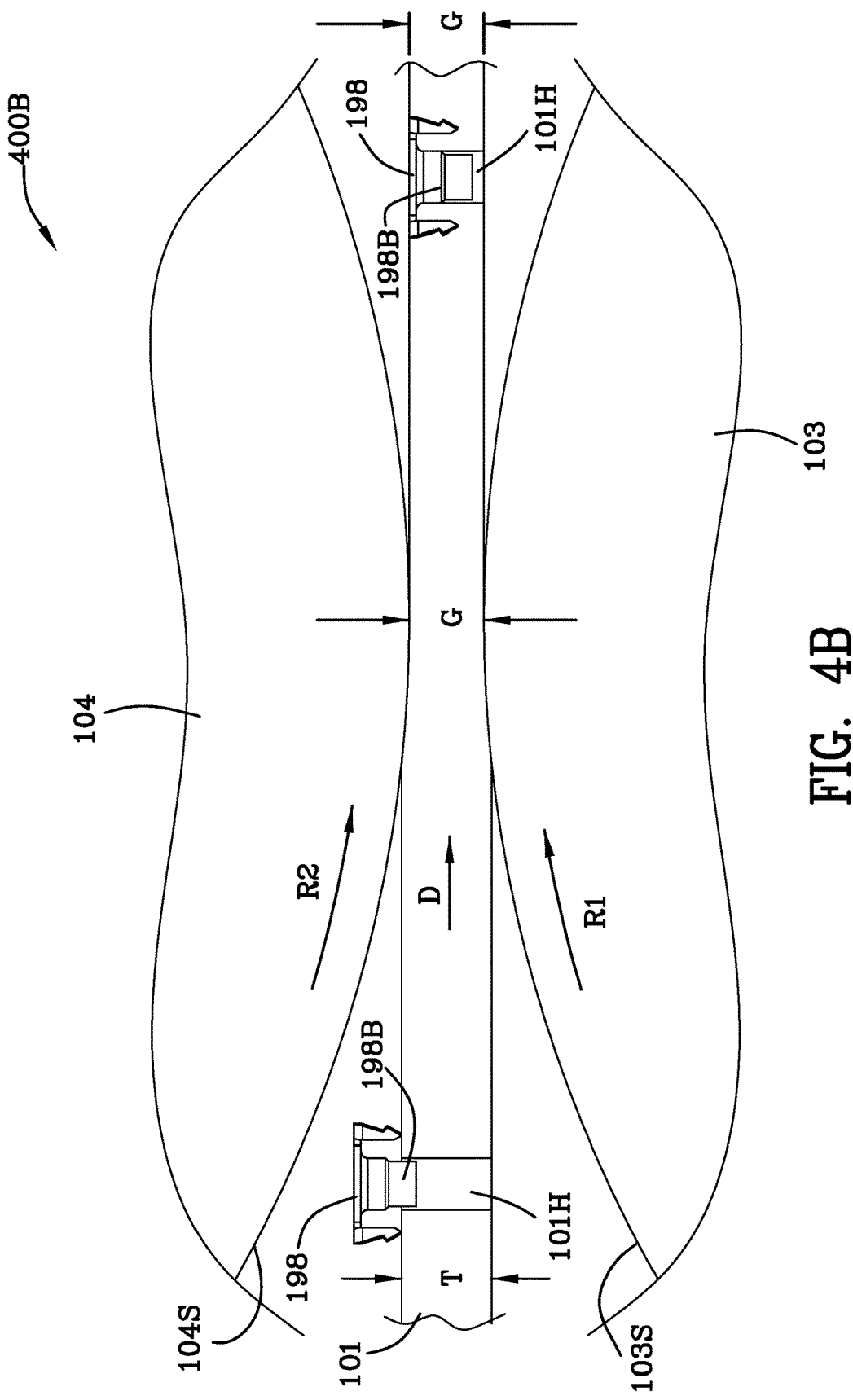
FIG. 4B is an illustration of the lower and upper rollers with a substrate therebetween for the insertion of a T-Nut therein.
Figure 4C:
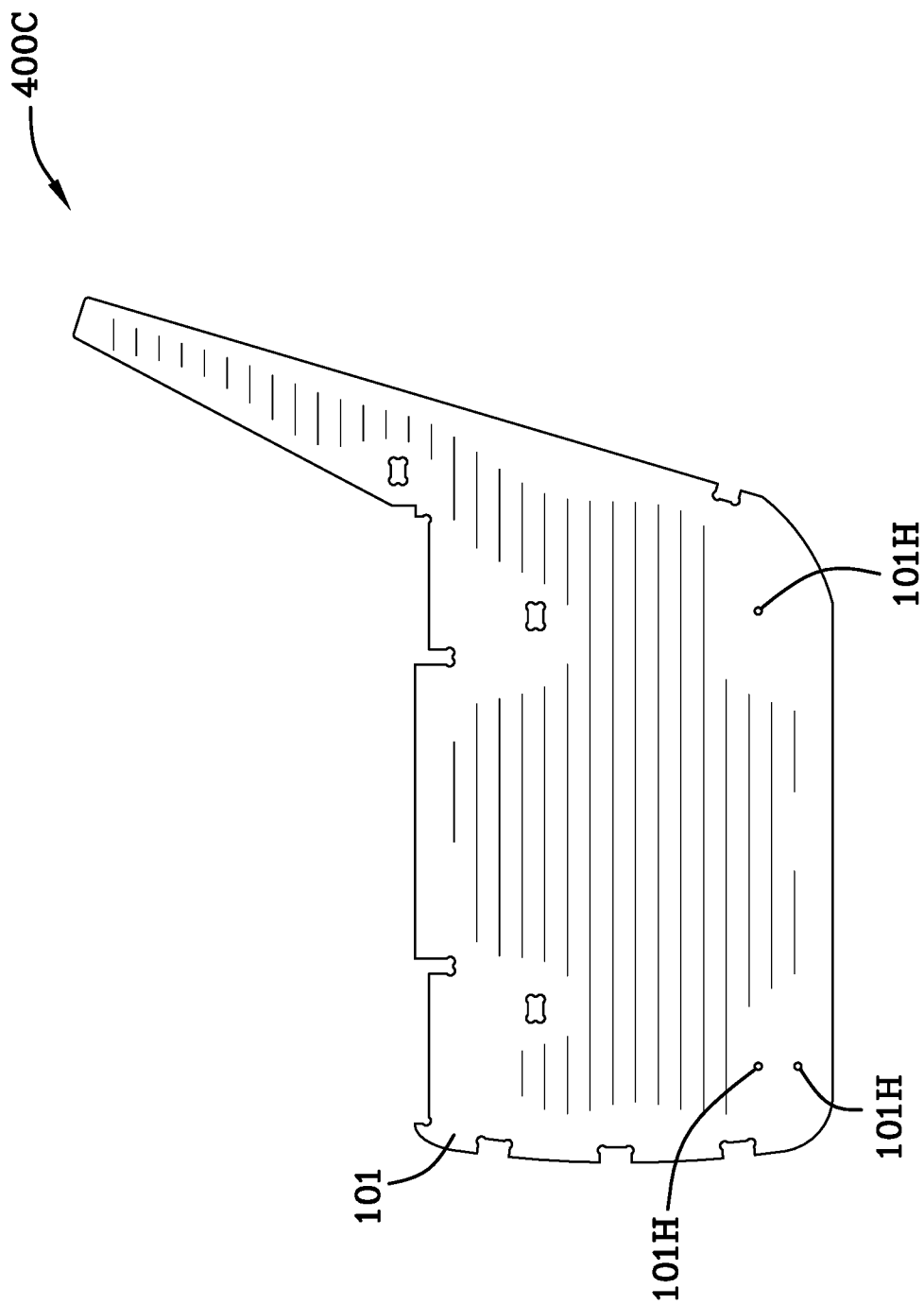
FIG. 4C is a view of a substrate with random holes drilled therein.

FIG. 4 is a view 400 of one type of insertable fastener. FIG. 4A is a typical T-Nut type of fastener 198 illustrating prongs 198P, a barrel portion, a flange 198F, and, flange edges 198E. Other types of fasteners may be used include propel nuts.

FIG. 4B is an illustration 400B of the lower 103 and upper rollers 104 with a substrate 101 therebetween for the insertion of a T-Nut 198 therein. FIG. 4B has been described in detail above.

FIG. 4C is a view 400C of a substrate with random holes 101H drilled therein.

REFERENCE NUMERALS 100 top perspective view of the insertable fastener installation apparatus illustrated in FIG. 1
100A side view of the insertable fastener installation apparatus illustrated in FIG. 1A
100B top perspective view of a portion of the insertable fastener installation apparatus illustrating the rotatable vibrating bowls and the tracks leading from the bowls to respective escapements illustrated in FIG. 1B
100C view of enclosure
101 substrate
D direction of substrate movement
G gap between first 103 and second 104 roller
T thickness of substrate 101
H hole in substrate 101
R radius of rollers, typically 16 inches
R1, R2 arrows indicating direction of rotation
102 roller press station
102M motor for roller press station
102T transmission for roller press station
103 first roller 103
104 second roller 104

103A first axis of first roller
104A second axis of second roller
103S metal surface of first roller
104S metal surface of second roller
105 first portion of conveyor system, the feed portion
105D second portion of conveyor system, the discharge portion
105M motor for driving second portion of conveyor system
106 optical vision system
106C camera
106 cone representing field of view of the camera 106C
108 hopper feed system
108A bulk hopper
108B vibratory rotating fastener alignment bowl
108E escapement
108T track for fasteners, in particular, T-Nuts
109 robot system
109A motor driven arm of robot system
109G fastener gripper which typically grips the edge of a T Nut
109S slot in gripper
160, 161, 162 gearing for driving lower roller 103
165, 166, 167 gearing for driving upper roller 104
193 safety enclosure around apparatus
194 safety enclosure
197 control panel
198 T-Nut
198B barrel portion of the T-Nut
198E edge of T-Nut
198F flange
198P prong of T-Nut
198T threads in the interior of the barrel
199F main support/frame for hopper feed system and optical vision system
200 top perspective view of a portion of the insertable fastener installation apparatus illustrating the cameras, the robot pick and place system, the tracks and their respective escapements illustrated in FIG. 2
200A enlargement of a portion of FIG. 2 illustrating the cameras, the robot pick and place system, the tracks and their respective escapements illustrated in FIG. 2A
200B perspective view of the robotically operated gripper illustrated in FIG. 2B
200C perspective view of one of the escapements illustrated in illustrated in FIG. 2C
200D cross-sectional view of the escapement illustrated in FIG. 2C taken along the lines 2D-2D illustrated in FIG. 2C
200E cross-sectional view of the escapement illustrated in FIG. 2C taken along the lines 2E-2E illustrated in FIG. 2C
200F cross-sectional view of the escapement illustrated in FIG. 2C taken along the lines 2F-2F illustrated in FIG. 2C
200G cross-sectional view of the base portion of the escapement illustrated in FIG. 2C
200H perspective view of one of the escapements illustrated in illustrated in FIG. 2C
200I enlarged perspective view of a T-nut hopper, a rotating vibratory bowl, a track and an escapement illustrated in FIG. 2F
200J perspective view of a portion of the insertable fastener installation apparatus illustrating a T-nut hopper, a rotating vibratory bowl, a track with T-nuts therein, and an escapement illustrated in FIG. 2G
200K a perspective view of a portion of the insertable fastener installation apparatus illustrating the camera system and the pick and place robotic system illustrated in FIG. 2H
200L enlarged perspective view of a portion of the insertable fastener installation apparatus Illustrating the camera system and the pick and place robotic system illustrated in FIG. 2I
200M another perspective view of a portion of the insertable fastener installation apparatus illustrating a T-nut hopper, a rotating vibratory bowl, a track with T-nuts therein, and an escapement illustrated in FIG. 2J
200N cross sectional view taken along the lines 2K-2K of FIG. 2C
201 base portion of escapement
201A track mounting surface
201B bottom surface of slot 201S in the base portion 201;
201D beveled edge of bottom 201B of slot 201S
201H upper portion of escapement
201J upper surface of base portion
201K notch in base portion of escapement creating room for gripper 109G to be inserted at the end of the escapement
201M notch in base portion of escapement creating room for gripper 109G to be inserted at the end of the escapement
201N end abutment affixed to base portion of escapement
201P arrow pointing to guide slot for the prongs 198P
201S flange slot
201I top of slot 201S
201X end support for T-Nut flange
202 channel in track 108T
201W wall to guide prongs 198P of T-Nut 198
300 a perspective view of a portion of the insertable fastener installation apparatus illustrating the roller press and a portion the conveyor system illustrated in FIG. 3
300A another perspective view of a portion of the insertable fastener installation apparatus illustrating the roller press and a portion the conveyor system illustrated in FIG. 3A
300B another perspective view of a portion of the insertable fastener installation apparatus illustrating a portion of the drive system of the roller press system illustrated in FIG. 3B
300C another view of a portion of the insertable fastener installation apparatus illustrating the drive system of the first, lower roller of the roller press system illustrated in FIG. 3C
300D another view of a portion of the insertable fastener installation apparatus illustrating the drive system of the first, lower roller of the roller press system illustrated in FIG. 3D
300E another view of a portion of the insertable fastener installation apparatus illustrating the drive system of the second, upper roller of the roller press system illustrated in FIG. 3E
300F another view of a portion of the insertable fastener installation apparatus illustrating the drive system of the second, upper roller of the roller press system and a portion of the drive system illustrated in FIG. 3F
300G perspective view of a portion of the discharge conveyor in FIG. 3F
301 computer system
302 lower roller drive system, chain and gearing
303 upper roller drive system, chain and gearing
400, 400A views of insertable fasteners, t-Nuts
400B view of substrate between rollers
400C substrate

The invention claimed is:

1. An insertable fastener installation apparatus for a substrate, comprising:
said substrate is flat and has a thickness T;
said substrate includes a plurality of holes H therein;
a roller press station;

said roller press station includes a first roller and a second roller which together form a roller press;
said first roller includes a first axis and said second roller includes a second axis;
said first axis and said second axis are parallel;
said first roller is cylindrically shaped and includes a metal surface;
said second roller is cylindrically shaped and includes a metal surface;
said metal surface of said first roller is spaced apart from said metal surface of said second roller by a gap G therebetween;
said gap G is less than said thickness T of said substrate;
a conveyor system;
said conveyor system includes a first portion and a second portion;
a plurality of insertable fasteners F, each one of said plurality of insertable fasteners F does not require deformation or rotation;
an optical vision system;
said optical vision system includes at least one camera;
a computer system;
a robot system;
a hopper feed system;
said hopper feed system includes a bulk hopper, a bowl, a track and an escapement;
said bulk hopper includes said plurality of said insertable fasteners F therein;
said bulk hopper feeds said each one of said plurality of insertable fasteners F into said bowl;
said bowl is rotatable and orients said each one of said plurality of insertable fasteners F therein into alignment with said track;
said each one of said plurality of said insertable fasteners F slide down said track into said escapement;
said robot system includes a gripper;
said gripper engages said each one of said plurality of said insertable fasteners F in said escapement and removes said each one of said plurality of said insertable fastener F therefrom;
said substrate resides on said first portion of said conveyor system;
said substrate moves relative to said hopper feed system and said vision system;
said gripper of said robot system transports said each one of said plurality of said insertable fasteners F according to a command of said computer system;
said computer system receives an image from said optical system and generates a movement command;
said gripper of said robot system transports said each one of said plurality of said insertable fasteners according to said movement command of said computer system;
said gripper of said robot system partially inserts said each one of said plurality of said insertable fasteners F in a respective one of said holes H of said substrate;
said first portion of said conveyor drives said substrate toward and into said roller press;
said first roller and said second roller rotate in opposite directions engaging said substrate and slightly compressing said substrate as it is driven through said roller press; and,
as said substrate exits said first and said second rollers propel said substrate onto said second portion of said conveyor system for transport away from said roller press station.

2. An insertable fastener installation apparatus for a substrate as claimed in claim 1 wherein said first and second rollers include metal surfaces made of stainless steel.

3. An insertable fastener installation apparatus for a substrate as claimed in claim 1 wherein said substrate is selected from the group consisting of wood, plywood, chipboard, oriented strand board, frame grade plywood, and plastic.

4. An insertable fastener installation apparatus for a substrate as claimed in claim 1 wherein said track is arranged vertically and a plurality of insertable fasteners are vertically stacked exerting pressure on an endmost insertable fastener in said escapement.

5. An insertable fastener installation apparatus for a substrate as claimed in claim 1 wherein said first roller and said second roller are stainless steel.

6. An insertable fastener installation apparatus for a substrate as claimed in claim 1 wherein said first roller and said second roller are sized based on the thickness of the substrate so as to compress said t nuts each one of said plurality of fasteners into said substrate.

7. An insertable fastener installation apparatus for a substrate as claimed in claim 1, further comprising: said vision system includes a plurality of cameras.

8. An insertable fastener installation apparatus for a substrate as claimed in claim 1 wherein said escapement comprises:
a first end and a second end;
a flange slot and a prong slot for guiding each one of said plurality of said insertable fasteners between said first end portion and said second end portion of said escapement;
a base portion, said base portion includes a bottom surface and a top surface;
an upper portion, said upper portion includes a bottom surface and a top surface;
said prong slot comprises a first prong guide wall and a second prong guide wall, and said first prong guide wall and said second prong guide wall slidingly guide prongs of each one of said plurality of insertable fasteners therein;
said prong slot includes a beveled opening in said first end portion;
said flange slot includes a beveled opening in said first end portion; and, said flange slot includes a top and a bottom surface;
said bottom surface of said upper portion is affixed to said upper surface of said base portion;
an end portion affixed to said second end portion of said escapement;
said end portion abuts said first prong guide wall and said second prong guide wall;
said second end portion of said base portion includes a first notch and a second notch therein; and,
said first notch and said second notch provide an opening for said gripper of said robot to engage said insertable fasteners.

9. An insertable fastener installation apparatus for a substrate, comprising:
said substrate is flat and has a thickness T;
an escapement;
a plurality of fasteners;
each of said fasteners include prongs;
said substrate includes a plurality of holes H therein;
a robot system;
said robot system includes a gripper;

said gripper engages one of said plurality of insertable fasteners in said escapement and removes said one of said plurality of insertable fasteners F therefrom;

said escapement comprises: a first end portion and a second end portion; a flange slot and a prong slot for guiding said insertable fasteners between said first end portion of said escapement and said second end portion of said escapement; a base portion; and, an upper portion;

said base portion includes: said prong slot therein extending between said first end portion and said second end portion of said escapement, said prong slot comprises a first prong guide wall and a second prong guide wall, and said first prong guide wall and said second prong guide wall slidingly guide prongs of each one of said insertable fasteners therein; and, said prong slot includes a beveled opening in said first end portion;

said flange slot includes a beveled opening in said first end portion;

said base portion includes an upper surface and a bottom surface;

said upper portion includes a bottom surface and a top surface, said bottom surface of said upper portion is affixed to said upper surface of said base portion and forms said flange slot;

an end portion affixed to said second portion of said escapement;

said end portion abuts said first prong guide wall and said second prong guide wall;

said second end portion of said base portion includes a first notch and a second notch therein;

said first notch and said second notch provide an opening for said gripper of said robot to engage said insertable fasteners and remove them therefrom; and, said robot using said gripper positions said insertable fasteners partially in said holes, H, of said substrate.

10. An insertable fastener installation apparatus for a substrate as claimed in claim 9 wherein said substrate is selected from the group consisting of wood, plywood, chipboard, oriented strand board, frame grade plywood, and plastic.

11. An insertable fastener installation apparatus for a substrate as claimed in claim 9 wherein each one of said plurality of said insertable fasteners does not require deformation or rotation.

12. An insertable fastener installation method using pre-drilled substrates, comprising the steps of:
an insertable fastener installation apparatus operator places said pre-drilled substrates on a conveyor belt, said substrates must not overlap each other;
advancing said substrates through an entrance passageway of said safety enclosure and passing said substrates under a vision system;
utilizing said vision system and a computer, recognizing and recording presence of pre-drilled holes in said substrates;
gripping an insertable fastener from an escapement using a pneumatic gripper;
placing a portion of each of said insertable fasteners into said pre-drilled holes of said substrate and approximately centering said insertable fasteners into said pre-drilled holes without seating said insertable fastener into said substrate;
passing said substrates and said insertable fasteners through a roller press station wherein said insertable fasteners are inserted into said substrate; and,
expelling said substrates from said safety enclosure on a discharge conveyor.

13. An insertable fastener installation method as claimed in claim 12 wherein said insertable fastener does not require deformation or rotation.

14. An insertable fastener installation method as claimed in claim 12 wherein said substrate is selected from the group consisting of wood, plywood, chipboard, oriented strand board, frame grade plywood, and plastic.

15. An insertable fastener installation method as claimed in claim 12 wherein said step of passing said substrates and said insertable fasteners through a roller press station includes compressing said substrate.

16. An insertable fastener feeding apparatus, comprising:
a plurality of insertable fasteners;
each one of said plurality of insertable fasteners includes prongs;
an escapement for holding and positioning said insertable fastener;
said escapement includes a first end portion and a second end portion;
said escapement comprises: a flange slot and a prong slot for guiding each one of said insertable fasteners between a first end portion and a second end portion; a base portion; and, an upper portion;
said base portion includes: said prong slot therein extending between said first end portion and said second end portion, said prong slot comprises a first prong guide wall and a second prong guide wall, and said first prong guide wall and said second prong guide wall slidingly guide prongs of each one of said plurality of insertable fasteners therein; an upper surface and a bottom surface; said prong slot includes a beveled opening in said first end portion of said escapement; said flange slot includes a beveled opening in said first end portion of said escapement; and, an upper surface and a bottom surface;
said upper portion includes a bottom surface and a top surface, said bottom surface of said upper portion is affixed to said upper surface of said base portion and forms said flange slot therebetween;
an end portion affixed to said second end portion of said escapement;
said end portion abuts said first prong guide wall and said second prong guide wall;
said second end portion of said base portion includes a first notch and a second notch therein; and,
said first notch and said second notch provide an opening enabling removal of each one of said insertable fasteners from said escapement.

17. An insertable fastener feeding apparatus as claimed in claim 16, further comprising:
a track interconnected with said escapement for feeding each one of said plurality of insertable fasteners to said escapement;
a bowl located above said escapement, said bowl interconnected with said track;
said bowl orients said insertable fasteners and orients them into alignment with said track.

18. An insertable fastener installation apparatus for a substrate, comprising:
said substrate is flat and has a thickness T;
a plurality of fasteners;
said substrate includes a plurality of holes therein;
each one of said plurality of insertable fasteners residing in a respective one said holes;
a roller press station;

said roller press station includes a first roller and a second roller which together form a roller press;
said first roller includes a first axis and said second roller includes a second axis;
said first axis and said second axis are parallel;
said first roller is cylindrically shaped and includes a metal surface;
said second roller is cylindrically shaped and includes a metal surface;
said metal surface of said first roller is spaced apart from said metal surface of said second roller by a gap G therebetween;
said gap G is less than said thickness T of said substrate;
each one of said plurality of said insertable fasteners is inserted into a respective one of said plurality of holes in said substrate as said substrate passes between said first roller and said second roller.

\* \* \* \* \*

UNITED STATES PATENT AND TRADEMARK OFFICE
CERTIFICATE OF CORRECTION

PATENT NO. : 10,471,559 B2
APPLICATION NO. : 15/679147
DATED : November 12, 2019
INVENTOR(S) : Dieter Page 1 of 1

It is certified that error appears in the above-identified patent and that said Letters Patent is hereby corrected as shown below:

In the Specification

Column 3, Line 50, after the first occurrence of "illustrated in" delete "illustrated in".

Column 3, Line 51, after "FIG. 2I is" delete "a" and insert --an-- therefor.

Column 9, Line 42, after "barrel" delete "1986" and insert --198B-- therefor.

Column 9, Line 52, after "FIG. 2I is" delete "a" and insert --an-- therefor.

Column 9, Line 62, after "apparatus" delete "Illustrating" and insert --illustrating-- therefor.

Column 11, Line 44, after the first occurrence of "illustrated in" delete "illustrated in".

Column 11, Line 55, after the first occurrence of "illustrated in" delete "illustrated in".

Column 12, Line 2, after "apparatus" delete "Illustrating" and insert --illustrating-- therefor.

Column 12, Line 9, after "200N" delete "cross sectional" and insert --cross-sectional-- therefor.

Column 12, Line 24, before "top" delete "2011" and insert --201T-- therefor.

Column 12, Line 59, after "fasteners," delete "t-Nuts" and insert --T-Nuts-- therefor.

In the Claims

Column 14, Claim 6, Line 21, after the first occurrence of "said" delete "t nuts".

Signed and Sealed this
Twenty-eighth Day of April, 2020

Andrei Iancu
*Director of the United States Patent and Trademark Office*